United States Patent
Friedman (12)

(10) Patent No.: US 11,202,418 B2
(45) Date of Patent: Dec. 21, 2021

(54) MODULAR FARM WITH CAROUSEL SYSTEM

(71) Applicant: Freight Farms, Inc., Boston, MA (US)

(72) Inventor: Jon Friedman, Boston, MA (US)

(73) Assignee: FREIGHT FARMS, INC., Boston, MA (US)

(*) Notice: Subject to any disclaimer, the term of this patent is extended or adjusted under 35 U.S.C. 154(b) by 279 days.

(21) Appl. No.: 16/325,808

(22) PCT Filed: Aug. 17, 2017

(86) PCT No.: PCT/US2017/047332
§ 371 (c)(1),
(2) Date: Feb. 15, 2019

(87) PCT Pub. No.: WO2018/035314
PCT Pub. Date: Feb. 22, 2018

(65) Prior Publication Data
US 2020/0037524 A1   Feb. 6, 2020

Related U.S. Application Data

(60) Provisional application No. 62/376,119, filed on Aug. 17, 2016.

(51) Int. Cl.
*A01G 31/04* (2006.01)
*A01G 9/029* (2018.01)
(Continued)

(52) U.S. Cl.
CPC ........... *A01G 31/047* (2013.01); *A01G 9/023* (2013.01); *A01G 9/0295* (2018.02);
(Continued)

(58) Field of Classification Search
CPC .. A01G 31/047; A01G 9/0299; A01G 9/0295; A01G 9/249; A01G 9/023; A01G 9/246; A01G 9/247
See application file for complete search history.

(56) References Cited

U.S. PATENT DOCUMENTS 4,068,405 A * 1/1978 Campbell ............ A01G 31/042
                                                            47/65
4,800,674 A    1/1989 Sprung
(Continued)

FOREIGN PATENT DOCUMENTS

GB          984404 A      2/1965
KR    20130059044 A      6/2013
(Continued)

OTHER PUBLICATIONS

Extended European Search Report issued by the European Patent Office in corresponding European Patent Application No. 17842113.7, dated Jun. 30, 2020.
(Continued)

*Primary Examiner* — Timothy D Collins
*Assistant Examiner* — Brittany A Lowery
(74) *Attorney, Agent, or Firm* — Arent Fox LLP

(57) ABSTRACT

A container farm provides a grow zone and a work zone within an enclosure. Plants are grown in vertical grow towers within the grow zone supported by a rotatable carousel grow structure. The grow towers can be moved within the grow zone to a location in which they are accessible from the work zone. A seedling station can be provided within the work zone. Other systems, including an irrigation system, a lighting system, and a climate control system, can be provided to support the growth of plants within the container.

18 Claims, 23 Drawing Sheets

(51) Int. Cl.
   *A01G 9/24*     (2006.01)
   *A01G 9/02*     (2018.01)
(52) U.S. Cl.
   CPC .......... *A01G 9/0299* (2018.02); *A01G 9/246* (2013.01); *A01G 9/247* (2013.01); *A01G 9/249* (2019.05)

(56) References Cited

U.S. PATENT DOCUMENTS

| | | |
|---|---|---|
| 5,514,191 A | 5/1996 | Miller et al. |
| 8,443,546 B1 | 5/2013 | Darin |
| 9,288,948 B2 | 3/2016 | McNamara et al. |
| 9,374,952 B1 * | 6/2016 | Cross .................. A01G 31/047 |
| 2007/0283862 A1 | 12/2007 | Kobayashi et al. |
| 2014/0000162 A1 | 1/2014 | Blank |
| 2014/0020292 A1 | 1/2014 | McNamara et al. |
| 2015/0007498 A1 | 1/2015 | Hensley |
| 2015/0223418 A1 | 8/2015 | Collins et al. |
| 2015/0351325 A1 | 12/2015 | Shelor et al. |
| 2016/0037733 A1 | 2/2016 | Baker et al. |

FOREIGN PATENT DOCUMENTS

| | | |
|---|---|---|
| KR | 20140072632 A | 6/2014 |
| WO | WO 2013/123557 A1 | 8/2013 |

OTHER PUBLICATIONS

European Search Report issued by the European Patent Office in corresponding European Patent Application No. 17842113.7, dated Jan. 13, 2020.

* cited by examiner

MODULAR FARM WITH CAROUSEL SYSTEM

CROSS REFERENCE TO RELATED APPLICATIONS

This application claims priority under 35 U.S.C. § 119(e) of U.S. Provisional Application No. 62/376,119, filed on Aug. 17, 2016, entitled "Modular Farm," the disclosure of which is hereby incorporated by reference.

BACKGROUND

The need for fresh food is growing as the population increases and changes in the climate impact growing seasons. The current food supply model, based on traditional farming methods and long distance shipping, is economically and environmentally unsustainable. Traditional farming operations are usually located in agricultural areas, which require large upfront costs and large acreage and have high operational costs from seed to sale.

Urban and local agriculture also faces obstacles. Growing space in urban areas is limited and not sufficient to meet a high demand. High start-up and operating costs of greenhouses make local crop production difficult for many businesses. Structures intended to support rooftop greenhouses must be evaluated by structural engineers and often require additional bracing to support the weight. Urban gardens often must address contaminated soil. Hydroponics systems are not easily used in urban locales, as most hydroponic systems are meant to be installed in agricultural settings, are not easily transportable, and require extensive training of personnel for operation.

Contained agricultural systems have recently been developed to address these issues. For example, a growing system in a modular container, described in U.S. Pat. No. 9,288,948, has been developed for generating high-yield crops. Within the modular container, the growing system includes a germination station for nurturing seeds until they germinate into plants, a plurality of vertical racks to hold the growing plants, a lighting system to provide appropriate light for the plants, an irrigation system to provide nutrients to the plants, a climate control system to control the environmental conditions within the container, and a ventilation system for providing airflow to the plants.

SUMMARY OF THE INVENTION

A modular farm for plant production is provided for efficient plant production. In some embodiments, the modular farm includes a container, a carousel system mounted for rotation about a central vertical axis within the container, and a plurality of plant grow towers mountable to the carousel system for rotation therewith about the central vertical axis, each plant grow tower including an elongated channel for growing plants. In some embodiments, a carousel system for growing plants is provided. The carousel system includes a hub including a stationary base including a mounting fixture to attach to a ceiling or roof structure, a rotator attached to the stationary base for rotation about a vertical axis with respect to the stationary base, an arm assembly attached to the rotator for rotation therewith, and a plurality of plant grow towers suspendable from the arm assembly for rotation therewith about the central vertical axis, each plant grow tower including an elongated channel for growing plants.

Other embodiments of the invention include the following:

1. A modular farm for plant production, comprising:
  a container;
  a carousel system mounted for rotation about a central vertical axis within the container; and
  a plurality of grow towers mountable to the carousel system for rotation therewith about the central vertical axis, each grow tower comprising an elongated column for growing plants.
2. The modular farm of embodiment 1, wherein each grow tower is further mountable to the carousel system for rotation about a further vertical axis spaced from the central vertical axis.
3. The modular farm of any of embodiments 1-2, further comprising an enclosed space within the container comprising a grow zone and a work zone, and wherein the carousel system is operable to rotate the grow towers about the vertical axis to move a portion of the grow towers into a location accessible from the work zone.
4. The modular farm of any of embodiments 1-3, wherein one or more of the grow towers comprises a plant panel comprising a plurality of adjacent, integrally formed elongated channels, a mounting fixture disposed on a back wall of the plant panel configured to removably suspend the plant panel from the carousel grow structure.
5. The modular farm of embodiment 4, further comprising a plant support medium disposed within the elongated channel, the plant support medium comprising an open cell or porous material having a slit disposed along a length parallel to a direction of elongation of the elongated channel.
6. The modular farm of any of embodiments 1-5, wherein one or more of the grow towers comprises a rack supporting a column of plant growing containers.
7. The modular farm of embodiment 6, wherein the plant growing container contains an inoculated substrate for growing mushrooms.
8. The modular farm of any of embodiments 1-7, wherein one or more of the grow towers comprises a plant panel assembly including support panel, a grow pocket on one face of the support panel, a nutrient flow channel on an opposite face of the support panel, and a fluid aperture in the support panel for fluid communication between the grow pocket and the nutrient flow channel.
9. The modular farm of any of embodiments 1-8, wherein the carousel system comprises hub mounted from a ceiling region of the container and including a rotation mechanism, a plurality of telescoping arms extending from the rotation mechanism, each of the plurality of grow towers mounted to a distal end of an associated one of the telescoping arms.
10. The modular farm of embodiment 9, further comprising a hanger arm rotatably attached to the distal end of each telescoping arm, one or a portion of the plurality of grow towers suspended from each hanger arm.
11. The modular farm of any of embodiments 1-10, wherein the carousel system comprises a belt disposed to travel along a horizontal track surrounding the central vertical axis, each grow tower suspended from the belt for travel therewith.
12. The modular farm of any of embodiments 1-11, wherein the plurality of grow towers are arranged to form plant walls with the elongated channels of the grow towers disposed to face outwardly to form opposite sides of each plant wall, and the carousel system is rotatable about the central vertical axis to move each plant wall to a location accessible from the work zone.
13. The modular farm of embodiment 12, wherein each plant wall is mounted to the carousel system for rotation about the further vertical axis to move each side of the plant wall to a location accessible from the work zone.

14. The modular farm of any of embodiments 12-13, further comprising a lighting system disposed to direct light toward plants growing on each side of the plant wall.

15. The modular farm of any of embodiments 1-14, further comprising an irrigation system comprising:
    a nutrient solution reservoir disposed in a region below a floor of the container;
    an irrigation line disposed to deliver a liquid nutrient solution from the nutrient solution reservoir to an upper end of each grow tower; and
    a pump in the nutrient solution reservoir connected to the irrigation line.

16. The modular farm embodiment 15, wherein the irrigation system further includes a plurality of emitters on the irrigation line, each emitter disposed above an associated one of the grow towers, each grow tower having an open upper end to receive a liquid nutrient solution from an associated emitter.

17. The modular farm of any of embodiments 15-16, wherein each grow tower has an open lower end to discharge liquid nutrient solution to return to the nutrient solution reservoir.

18. The modular farm of embodiment 17, further comprising a floor within the container, a portion of the floor beneath the grow towers in the work zone comprising an open grating.

19. The modular farm of any of embodiments 15-18, wherein the irrigation system further comprises an aerator disposed to introduce oxygen into the liquid nutrient solution in the nutrient solution reservoir.

20. The modular farm of any of embodiments 1-19, further comprising a nutrient dosing system comprising:
    a recirculation line disposed to recirculate a liquid nutrient solution from a nutrient solution reservoir,
    a plurality of nutrient sources, and
    a line from each nutrient source to the recirculation line to introduce a nutrient into the recirculation line.

21. The modular farm of embodiment 20, wherein the nutrient dosing system further comprises a recirculation pump disposed to pump a liquid nutrient solution from the nutrient solution reservoir through the nutrient dosing system and back to the nutrient solution reservoir.

22. The modular farm of any of embodiments 20-21, wherein the nutrient dosing system further comprises a sensor assembly disposed to sense one or more of pH, electrical conductivity, and temperature of a liquid nutrient solution in the recirculation line.

23. The modular farm of any of embodiments 20-22, wherein the nutrient dosing system further comprises a pump in each line from each nutrient source.

24. The modular farm of any of embodiments 20-23, wherein the nutrient dosing system is supported on a central column aligned with the central vertical axis in the grow zone.

25. The modular farm of any of embodiments 20-23, wherein the nutrient dosing system is supported on an interior wall of the container in the work zone.

26. The modular farm of any of embodiments 1-25, further comprising:
    a central column aligned with the central vertical axis; and
    a lighting system comprising lights disposed on sides of the central column to provide light to plants in each grow tower facing the central column.

27. The modular farm of embodiment 26, wherein the lighting system further comprises lights disposed on interior walls of the container to provide light to plants growing in the grow towers facing the interior walls.

28. The modular farm of any of embodiments 1-27, further comprising a lighting system in the grow zone comprising:
    a first set of lights disposed inwardly of and facing outwardly toward the grow towers; and
    a second set of lights disposed outwardly of and facing inwardly toward the grow towers.

29. The modular farm of embodiment 28, wherein the first set and the second set of the lighting system each include a plurality of lights of different frequencies.

30. The modular farm of any of embodiments 28-29, wherein the first set and the second set of the lighting system each include a plurality of blue lights and a plurality of red lights.

31. The modular farm of any of embodiments 28-30, wherein the lighting system includes a third set of white lights.

32. The modular farm of any of embodiments 28-31, wherein the lights of the first set and the second set comprise LED lights.

33. The modular farm of any of embodiments 28-32, wherein the lights of the first set and the second set are arranged in vertical strips.

34. The modular farm of any of embodiments 28-33, wherein the lights of the first set are supported on a central column aligned with the central vertical axis, and the lights of the second set are supported on interior walls of the container.

35. The modular farm of any of embodiments 1-34, further comprising a seedling station disposed within the container, the seedling station comprising a seedling trough disposed to support one or more seedling trays supporting seedling plugs in contact with a liquid nutrient solution in the trough.

36. The modular farm of embodiment 35, wherein the seedling station further includes an irrigation line disposed to circulate a liquid nutrient solution from a nutrient solution reservoir through the seedling trough.

37. The modular farm of any of embodiments 35-36, wherein the seedling station further includes a work shelf disposed above the seedling trough, the work shelf disposed to support one or more seedling trays thereon for access by a user.

38. The modular farm of any of embodiments 1-37, further comprising support surfaces disposed on opposite interior walls of the container in a work zone to support a grow tower in a horizontal orientation for access by a user.

39. The modular farm of embodiment 38, wherein the support surfaces comprise a bracket on one interior wall of the container and a work shelf on an opposite interior wall of the container.

40. The modular farm of any of embodiments 1-39, further comprising:
    a central column aligned with the central vertical axis; and
    a camera mounted to the central column and disposed to photograph plants growing in the plant grow towers.

41. The modular farm of any of embodiments 1-40, further comprising:
    a central column aligned with the central vertical axis; and
    a climate sensor mounted to the central column to sense one or more of air temperature, humidity, and a $CO_2$ level within the container.

42. The modular farm of any of embodiments 1-41, further comprising a climate control system comprising a heating, ventilating, and air conditioning system.

43. A carousel system for growing plants comprising:

a hub comprising a stationary base including a mounting fixture to attach to a ceiling or roof structure, and a rotation mechanism attached to the stationary base for rotation about a vertical axis with respect to the stationary base;

a plant tower support assembly attached to the rotation mechanism for rotation therewith;

a plurality of grow towers suspendable from the plant tower support assembly for rotation therewith about the central vertical axis, each grow tower including an elongated column for growing plants.

44. The carousel system of embodiment 43, wherein each grow tower comprises a plant panel comprising a plurality of adjacent, integrally formed elongated channels, a mounting fixture disposed on a back wall of the plant panel configured to removably suspend the plant panel from the grow tower support assembly.

45. The carousel system of any of embodiments 43-44, wherein the grow tower support assembly comprises an arm assembly attached to the rotation mechanism, and each grow tower is mounted to the arm assembly for rotation about a further vertical axis spaced from the vertical axis.

46. The carousel system of embodiment 45, wherein the arm assembly comprises a plurality of telescoping arms extending from the rotator, each of the plurality of grow towers mounted to a distal end of an associated one of the telescoping arms.

47. The carousel system of embodiment 46, further comprising a hanger arm rotatably attached to the distal end of each telescoping arm, one or a portion of the plurality of grow towers suspended from each hanger arm.

48. The carousel system of any of embodiments 43-47, wherein the plurality of grow towers are arranged to form plant walls with the elongated channels of the grow towers disposed to face outwardly to form opposite sides of each plant wall.

49. The carousel system of embodiment 48, wherein each plant wall is mounted to the tower support assembly for rotation about the further vertical axis spaced from the vertical axis.

50. The carousel system of any of embodiments 43-49, wherein each grow tower is suspended from the grow tower support assembly for rotation about a further vertical axis spaced from the vertical axis.

51. The carousel system of any of embodiments 43-50, wherein the grow tower support assembly comprises a belt disposed to travel along a track surrounding the central vertical axis, and each grow tower is suspended from the belt for travel therewith.

52. A grow tower for plants, comprising a plant panel comprising a plurality of adjacent, integrally formed elongated channels, a mounting fixture disposed on a back wall of the plant panel configured to removably suspend the plant panel from the carousel grow structure.

53. The grow tower of embodiment 52, further comprising a plant support medium disposed within the elongated channel, the plant support medium comprising an open cell or porous material having a slit disposed along a length parallel to a direction of elongation of the elongated channel.

DESCRIPTION OF THE DRAWINGS

The invention will be more fully understood from the following detailed description taken in conjunction with the accompanying drawings in which.

DETAILED DESCRIPTION OF THE INVENTION

Figure 1:
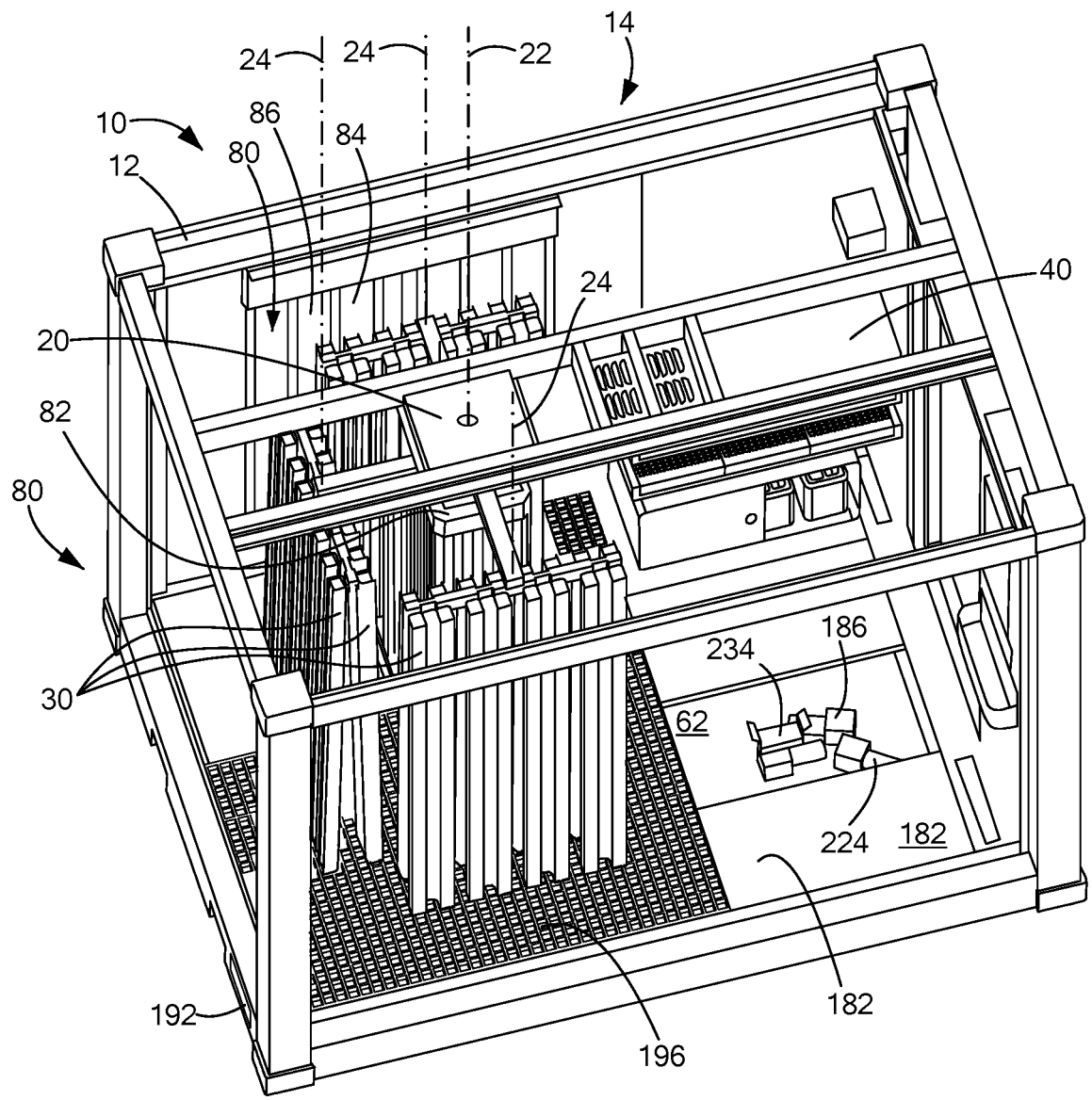
FIG. 1 is an isometric view of an embodiment of a modular farm.
Figure 2:
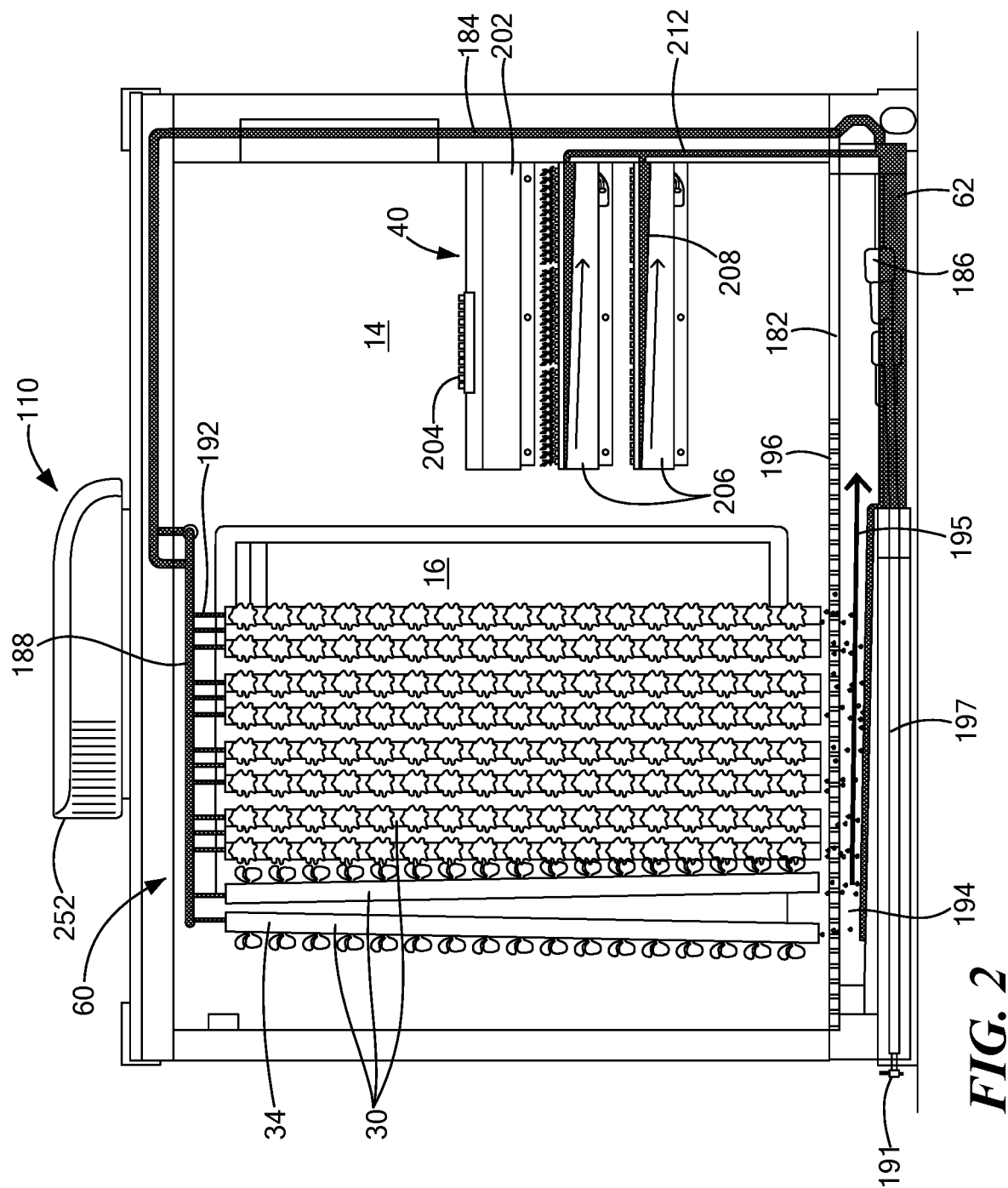
FIG. 2 is a side view of the modular farm of FIG. 1.
Figure 3:
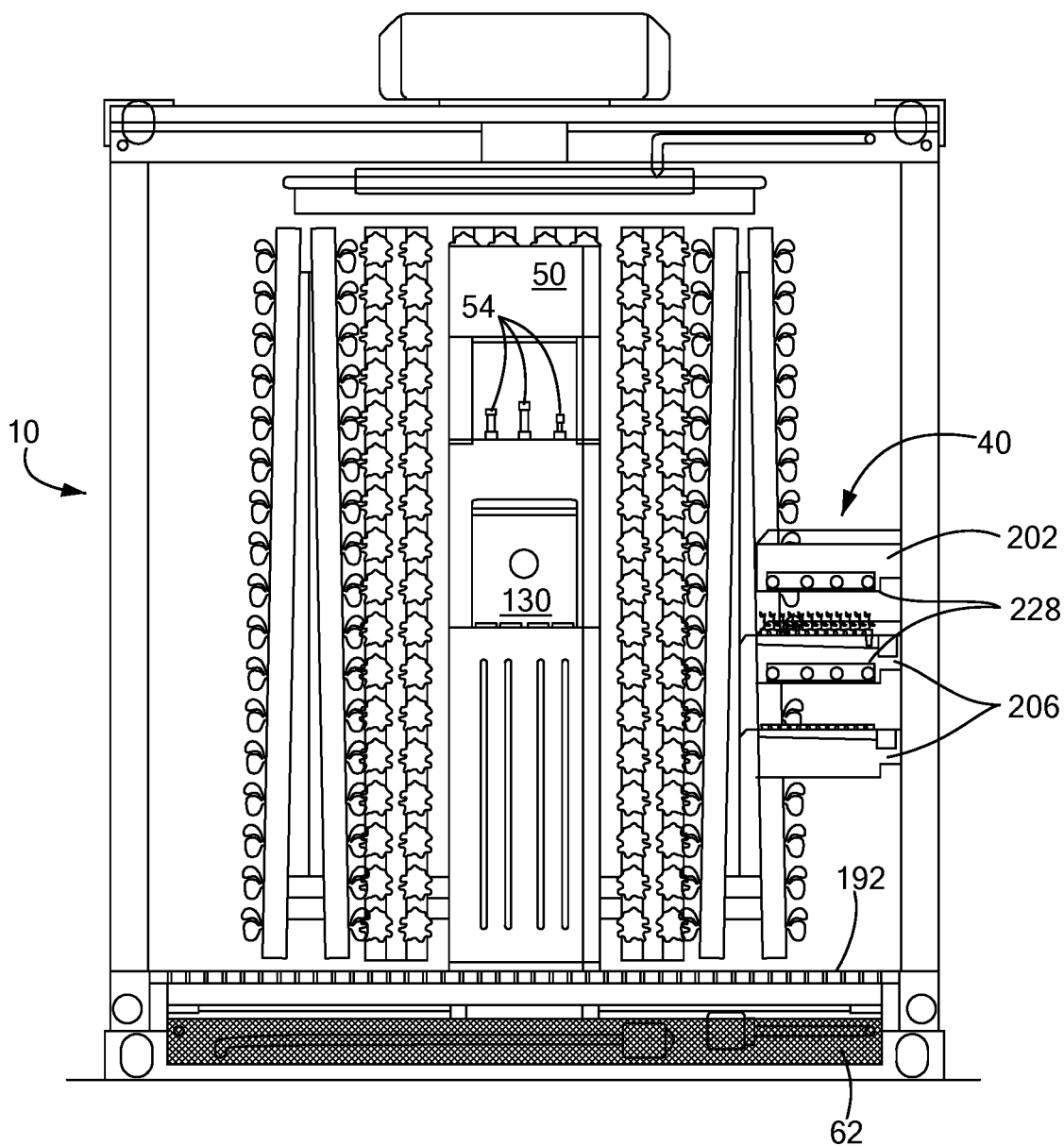
FIG. 3 is an end view of the modular farm of FIG. 1.
Figure 4:
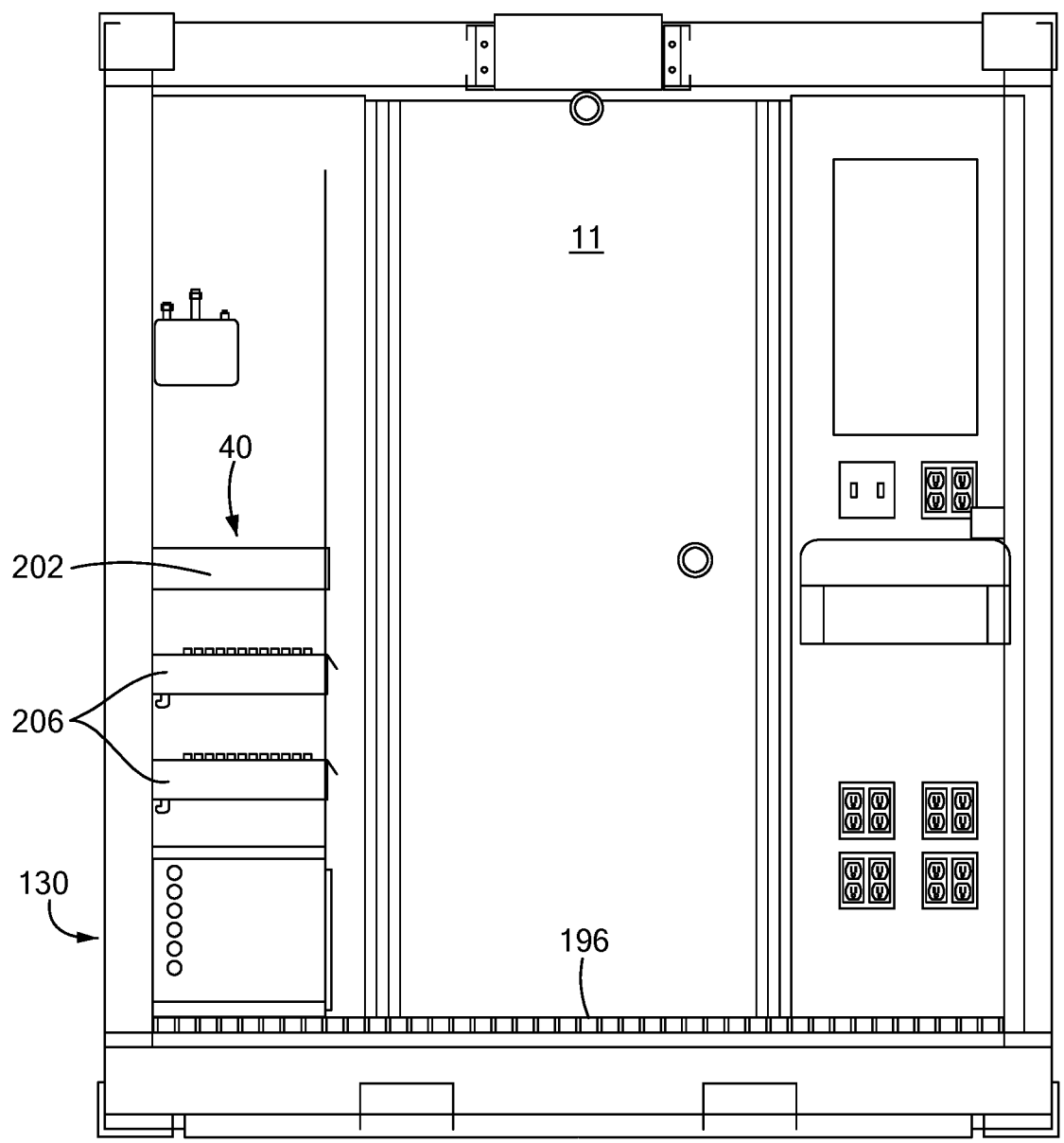
FIG. 4 is a further end view of the modular farm of FIG. 1.
Figure 5:
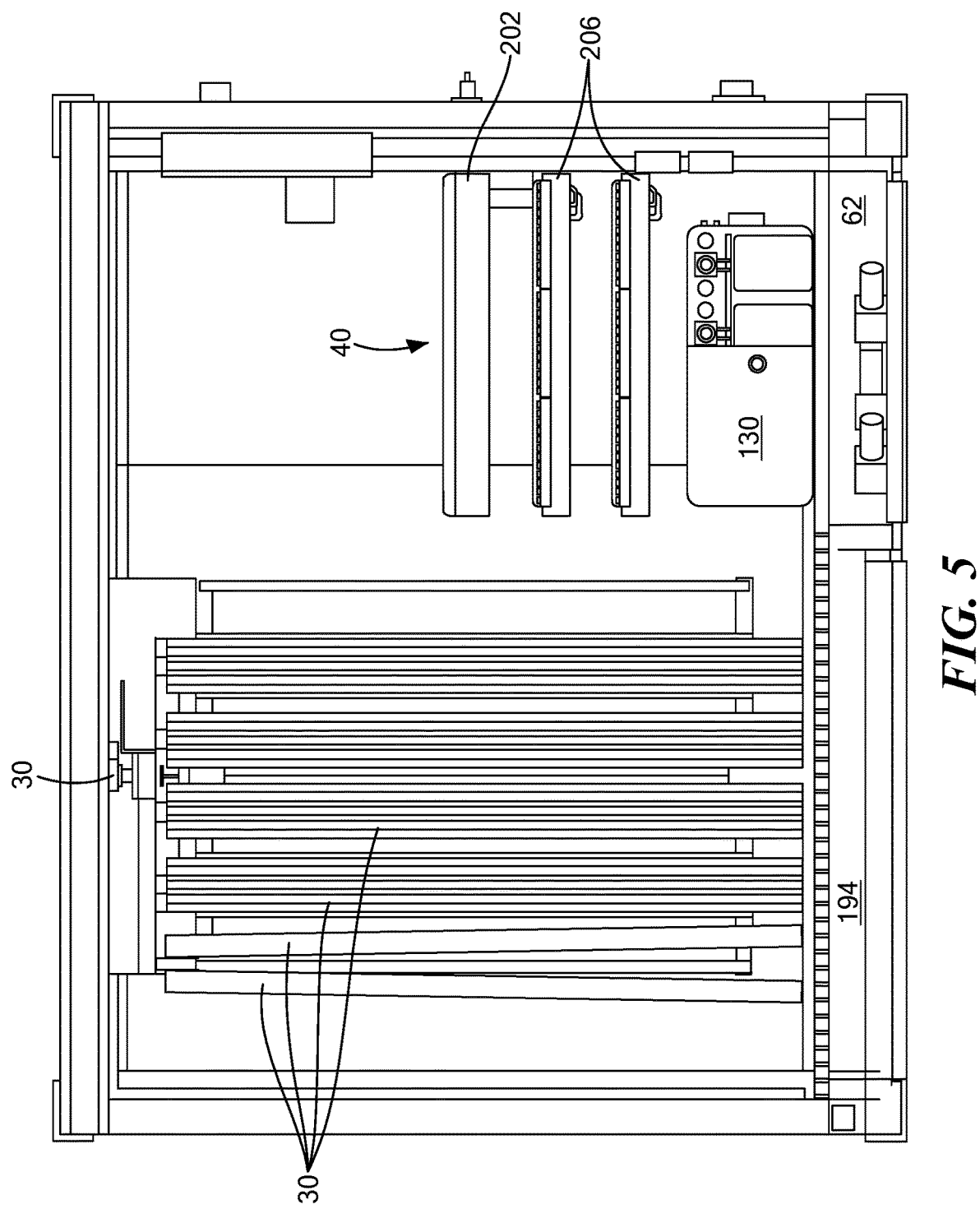
FIG. 5 is a further side view of the modular farm of FIG. 1.
Figure 6:
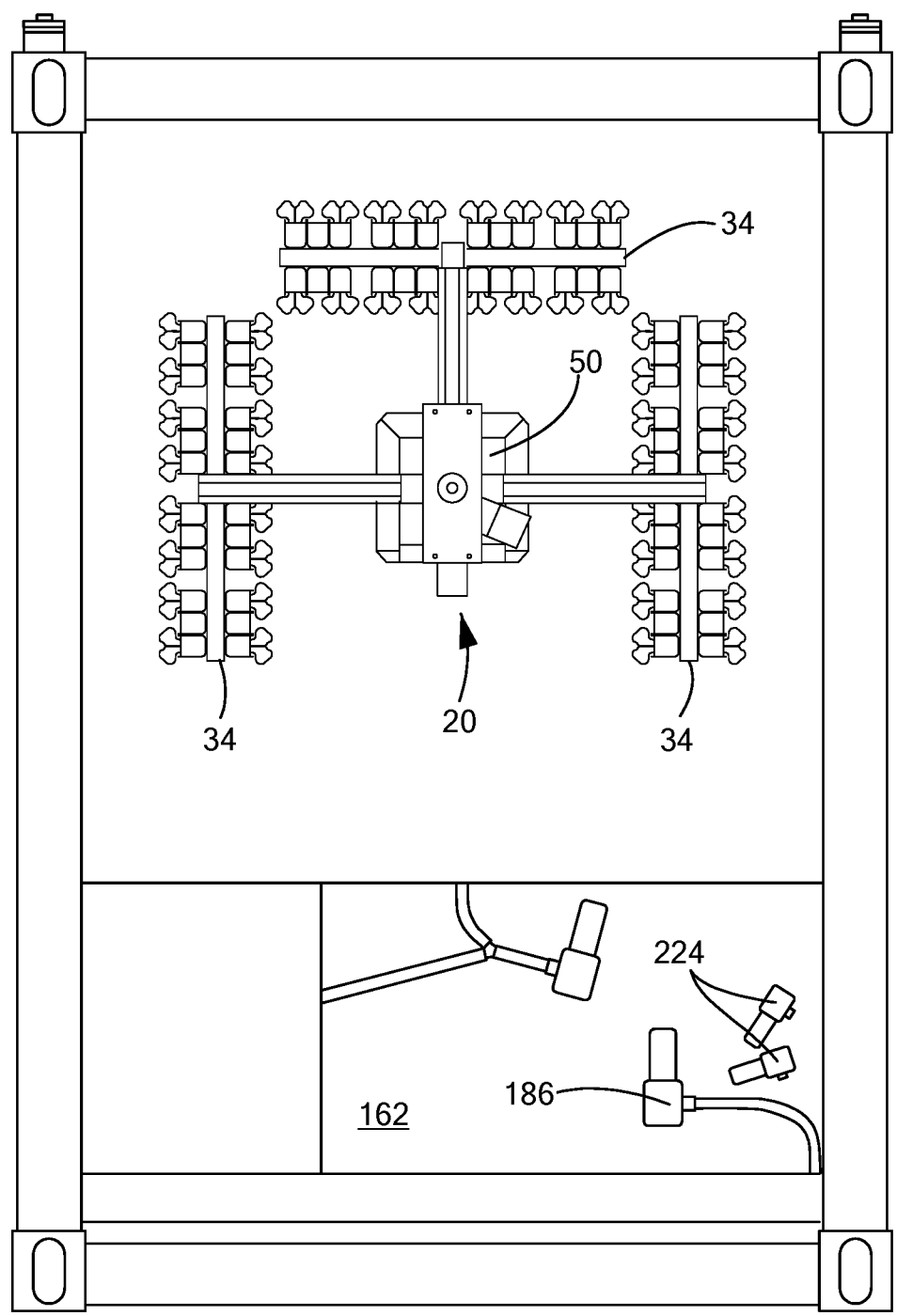
FIG. 6 is a top plan view of the modular farm of FIG. 1.

A modular farm is provided in which an entire growth cycle of one or more crops can be handled by a user, for example, a farmer, from a single, central point of operation. All tasks involved in growing a crop, from planting and germinating seeds to transplanting seedlings, growing the plants, and harvesting the crop, can be performed from one location, thereby improving work flow. The farmer does not have to walk through a farm from one place to another and does not have to transport seedlings from one location to another.

Referring to FIGS. 1-6, the modular farm 10 is housed within a container 12 that provides a suitable environment for growing plants. The container provides an enclosed space forming a work zone 14 and a grow zone 16. In the grow zone, a carousel system 20 is mounted for rotation about a central vertical axis 22. Crops are grown in vertical columns on grow towers 30 supported by the carousel system for rotation therewith about the central vertical axis. Each grow tower can also be mounted to the carousel system for rotation about a further vertical axis spaced from the central vertical axis (described further below). In this manner, the grow towers can be readily moved to a location in which a portion of the grow towers is accessible to a user in the work zone. A seedling station 40 can be provided within the container in a location that is also accessible from the work zone. A door 11 can be provided in one wall, for example, adjacent the work zone, to provide ingress and egress for the farmer to and from the work zone in the container.

Various additional systems can be included within the container to create a suitable environment for growing crops. The systems can include an irrigation system 60 for providing a liquid nutrient solution to plants growing in the grow zone and in the seedling station. A reservoir 62 for holding a liquid nutrient solution can be provided beneath a floor 182 in the container. A lighting system 80 can provide lighting of appropriate frequencies and schedules for the plants. A climate control system 110, for example, a heating, ventilation, and air conditioning or HVAC system, can provide an appropriate temperature, humidity level, $CO_2$ level, and air flow. Exterior connections 191 through the container walls can bring water and electricity to plumbing lines and electrical wiring within the container to serve the various systems.

In some embodiments, the grow towers 30 can be suspended from the carousel system 20 around a central volume. A central column 50 can be aligned with the vertical axis 22 to support various system components or portions thereof in the central volume. For example, lighting 82 for inwardly facing sides of the grow towers can be supported on the central column 50. Lighting 84 for outwardly facing sides of the grow towers can be supported on interior container walls. A nutrient dosing system 130 can be supported within the central column 50 or on an interior container wall to add nutrients to water to form the liquid nutrient solution. Various other components can be supported on or within the central column, such as climate sensors and a camera 54.

In some embodiments, each grow tower 30 can be formed as a plant panel 32 having a plurality of adjacent elongated grow channels 34. A plurality of plant panels can be arranged into a double-sided plant wall 36, in which the elongated grow channels are arranged in a generally back-to-back orientation to form opposite sides of the plant wall.

More particularly each plant panel 32 can include a number of grow channels 34, three in the embodiment illustrated. Each grow channel can include two side walls, a back wall, and an open front face. Each channel is open at both the top end and the bottom end. Stiffening beads can be located along the front edges of the side walls. The channels can have any cross sectional shape, such as U-shaped, C-shaped, square, rectangular, oval, or the like. The plant panel can be made of a polymer material that is non-toxic to plants, such as polyvinyl chloride. Other materials can be used. The material can be non-metallic to minimize weight. The plant panel can be formed in any suitable manner, such as by molding or additive manufacturing.

A plant support medium 35 is located within each channel. The plant support medium can be a single piece of material having a continuous slit 37 or a plurality of discrete slits along its length in alignment with the channel, or can be formed from two pieces of material compressed together. The plant support medium can be retained within the channel by the resiliency of the channel walls compressing against the plant support medium. Seedling plugs are placed in the slit or slits within or between the support medium. A liquid nutrient solution (from an irrigation system, described further below) is fed into each grow channel through the open top end and drips out the open bottom end, irrigating the plants within the grow channel as it flows downwardly through the plant support medium. See FIG. 2.

In some embodiments, the plant support medium 35 can be an open cell foam or matrix material with a large pore volume. In some embodiments, the open cell foam material is a polyurethane or a polyether. Other open cell foam materials can be used, such as polyethylene, polyethylene terephthalate, polypropylene, polystyrene, polyvinyl chloride, and polyester. In some embodiments, the material can be treated, for example, with a silicone binder or coating, to minimize contact between the nutrient solution and the material. Other types of plant support media can be used, such as a fibrous growth material.

Figure 7:
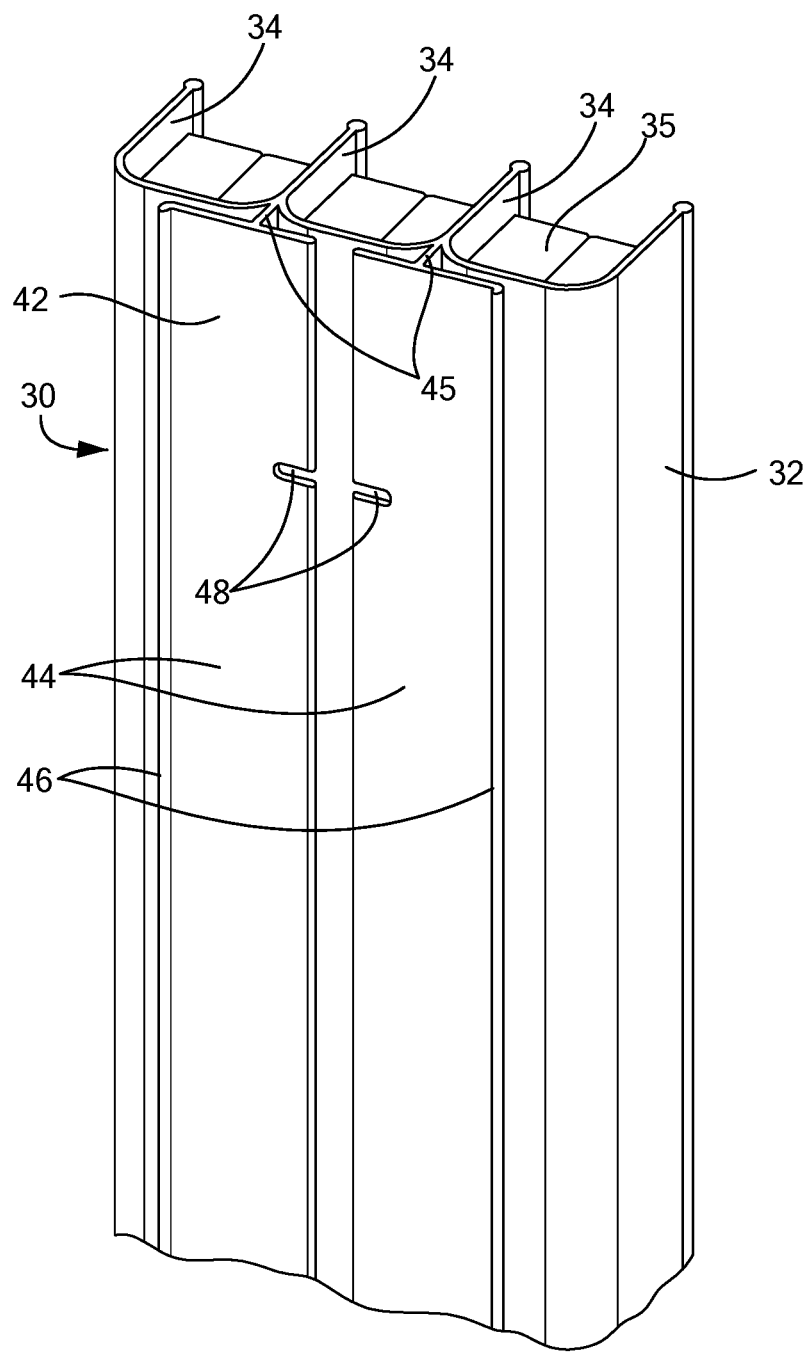
FIG. 7 is a partial isometric view of an embodiment of a plant panel.
Figure 8:
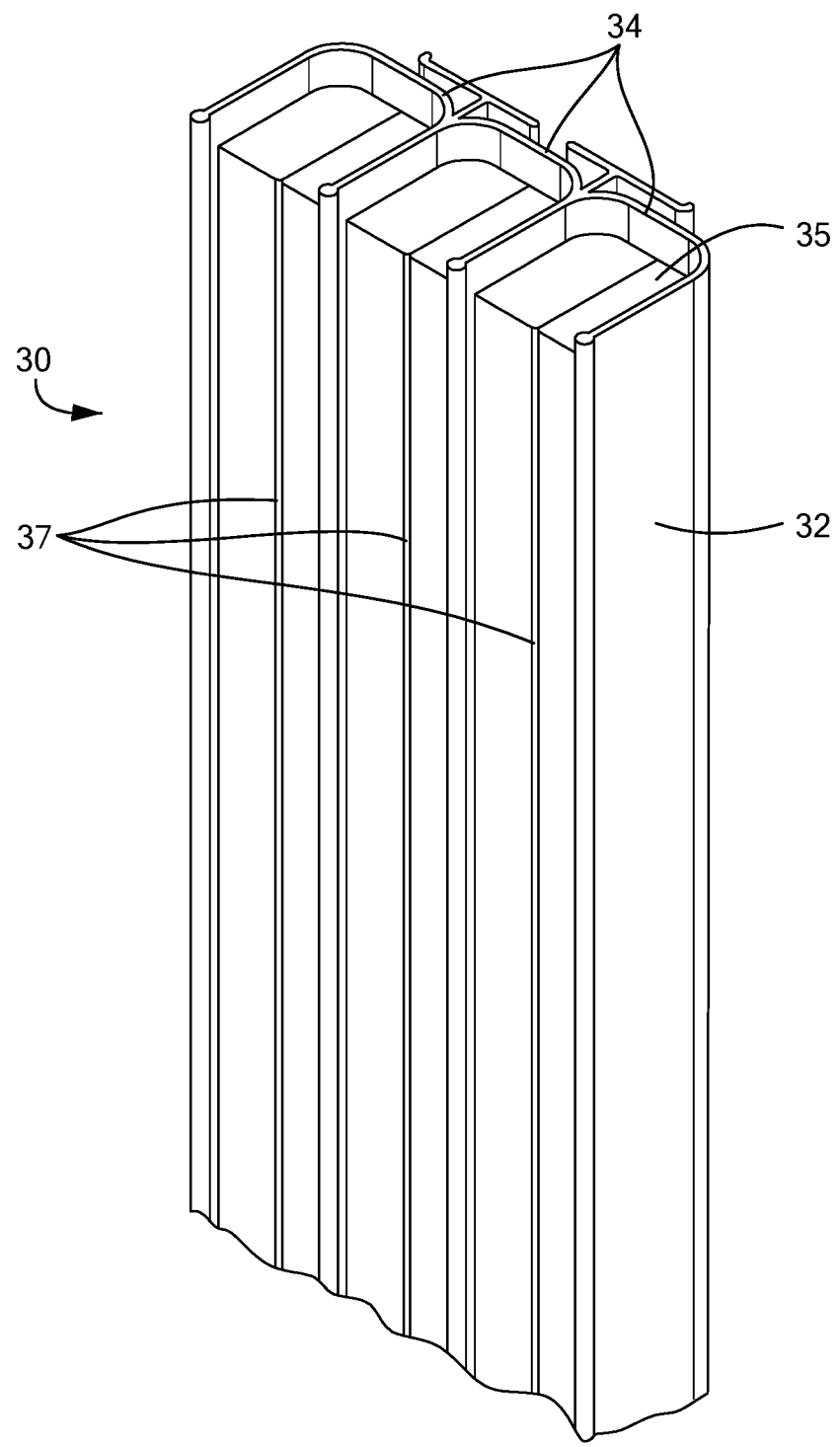
FIG. 8 is a further partial isometric view of the plant panel of FIG. 7.
Figure 9:
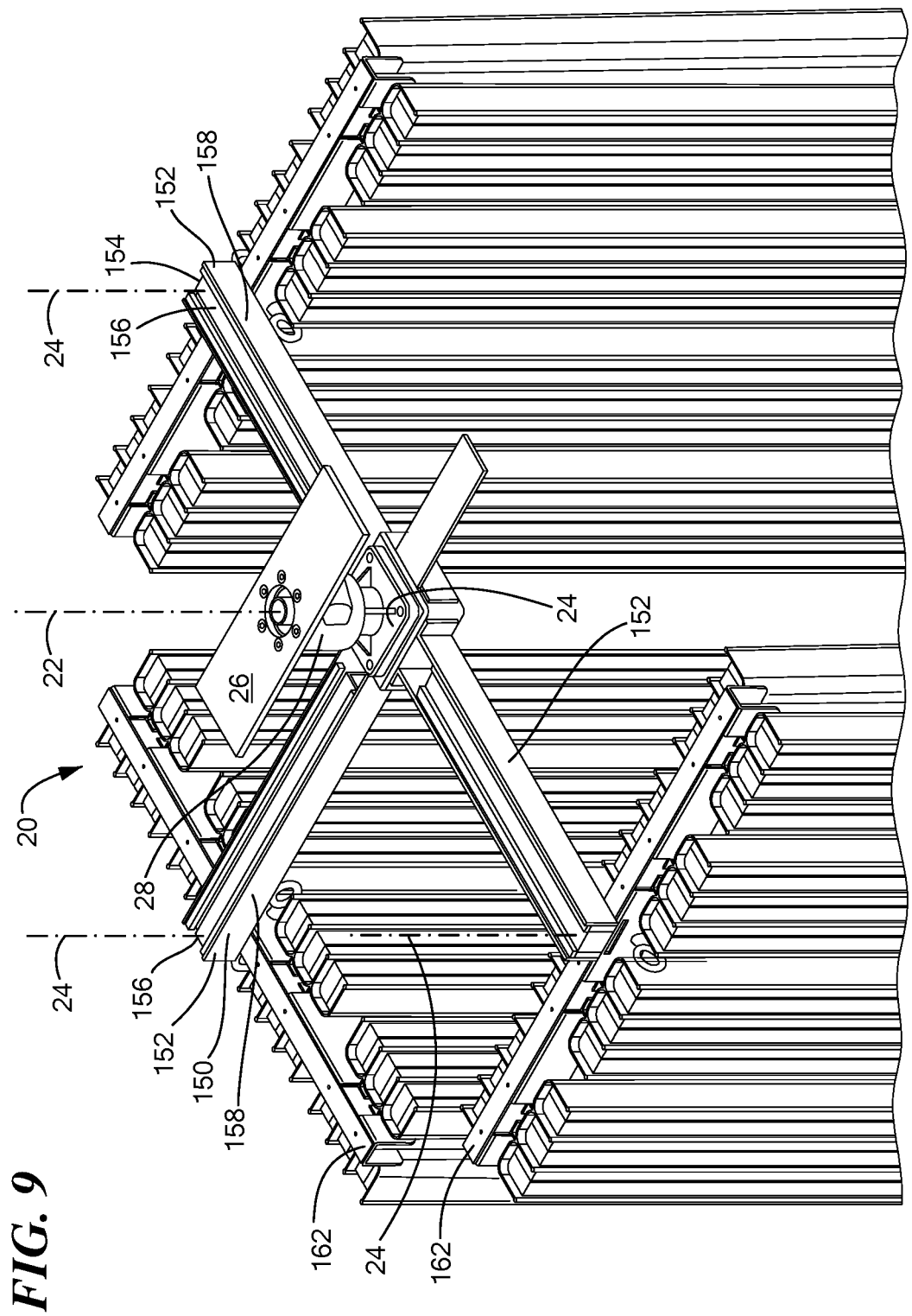
FIG. 9 is a partial isometric view of a carousel system of the modular farm of FIG. 1.
Figure 10:
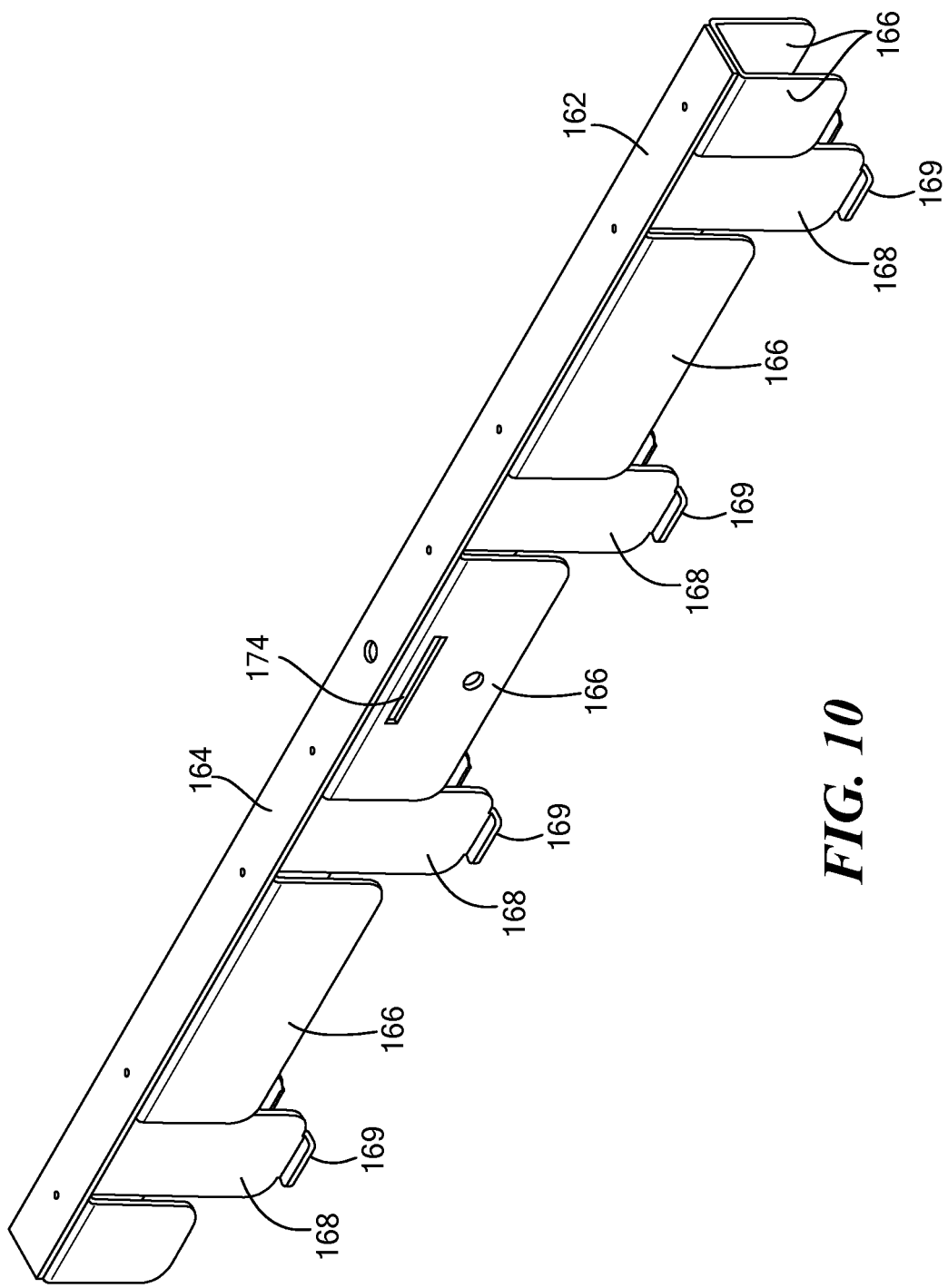
FIG. 10 is an isometric view of a hanger arm of the carousel system.
Figure 11B:
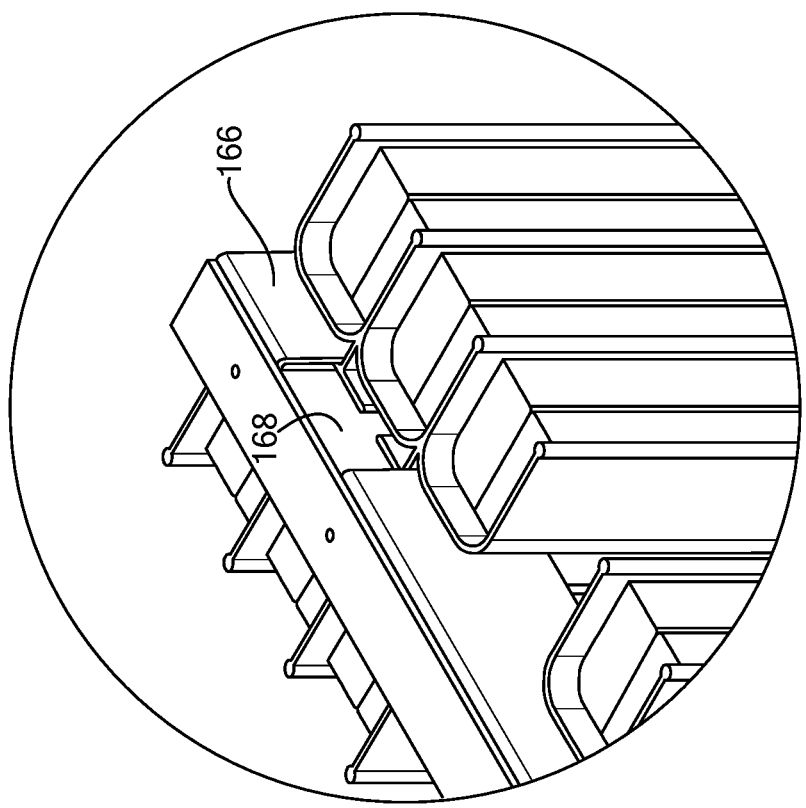
FIG. 11B is a further isometric view illustrating attachment of the plant panel to the hanger arm.
Figure 11A:
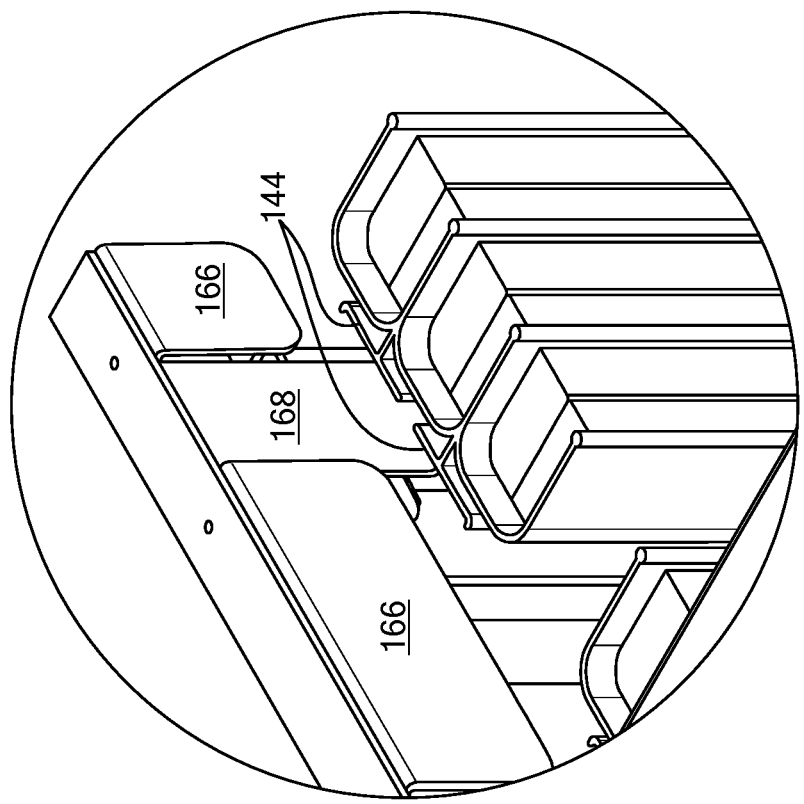
FIG. 11A is an isometric view illustrating attachment of a plant panel to a hanger arm.

The plant panel includes a mounting fixture 42 on a back side of the channels. See FIGS. 7-8. In some embodiments, the mounting fixture is formed from two mounting ribs 44 that extend all or a portion of the length of the channels 34. The mounting ribs are joined to the channels by rib connectors 45. The panel can include beads 46 along longitudinal edges of the mounting ribs. A horizontal mounting slot 48 is provided along inwardly facing edges of the mounting ribs at a location spaced downwardly from the top.

In some embodiments, the carousel system 20 includes a hub 24 supported for rotation above a vertical axis from structural members in a ceiling region of the container. The hub can include a stationary base 26 that can be fixedly attached to the structural members and a rotation mechanism 28 or rotator attached to the stationary base for rotation about a vertical axis with respect to the stationary base. An arm assembly 150 can be attached to the rotation mechanism for rotation therewith.

In some embodiments, the arm assembly 150 can include a plurality of horizontal, telescoping arms 152 extending from the hub to a distal end 154. Three arms are illustrated in the embodiment shown, although another number of arms can be used if desired. Each arm includes a telescoping slide 156 movable within an arm housing 158. A proximal end of the arm housing is attached to the hub, so that the telescoping arms can rotate about the vertical axis with the hub. The hub can be rotated in any suitable manner, such as with a motor. In some embodiments, the hub can be rotated in 90° increments. The hub can also be rotated manually, either in addition to or alternatively to motorized rotation.

A hanger arm 162 is mounted to the distal end of each telescoping slide 156, distal from the central hub. Each hanger arm includes a top plate 164. A number of front tabs 166 and a number of back tabs 168 extend downwardly on each side of the top plate. The back tabs are recessed slightly behind and are longer than the adjacent front tabs. A horizontal plant panel mounting hook 169 is provided on the lower end of each back tab.

A plurality of plant panels 32 can be mounted to each hanger arm 162. To mount a plant panel, the back of the plant panel is placed against a back tab 168, and the mounting ribs 44 are lined up with the inside edges of the front tabs. With the ribs behind the front tabs, the plant panel is slid up until the mounting hook 169 on the bottom of the back tab 168 slips into the mounting slot 48 on the ribs of the plant panel. The front and back tabs can be configured to hold the plant panels at any desired angle from vertical. In some embodiments, the plant panels are angled outwardly about from vertical to direct drainage of a nutrient solution to the bottom end of the channels. See FIG. 3. In some embodiments, the angle can range from 0° to 10°. In some embodiments, the plants are angled about 1° from vertical. In some embodiments, the plants are angled about 2° from vertical.

Figure 12B:
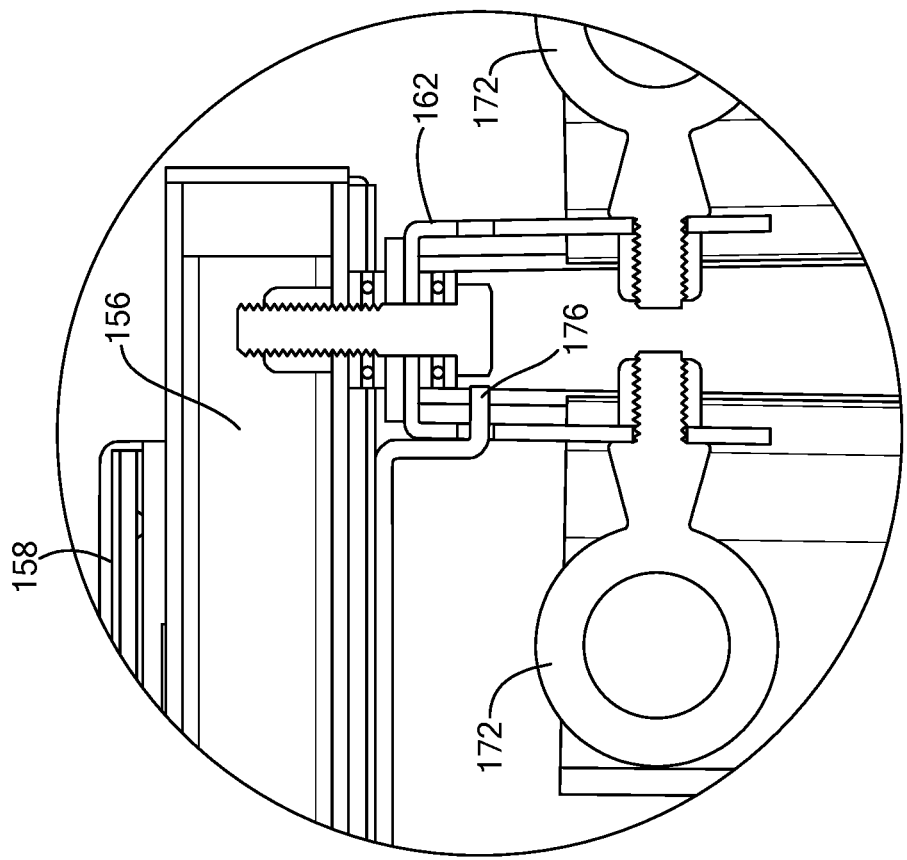
FIG. 12B is a further partial side view of the telescoping arm and hanger arm.
Figure 12A:
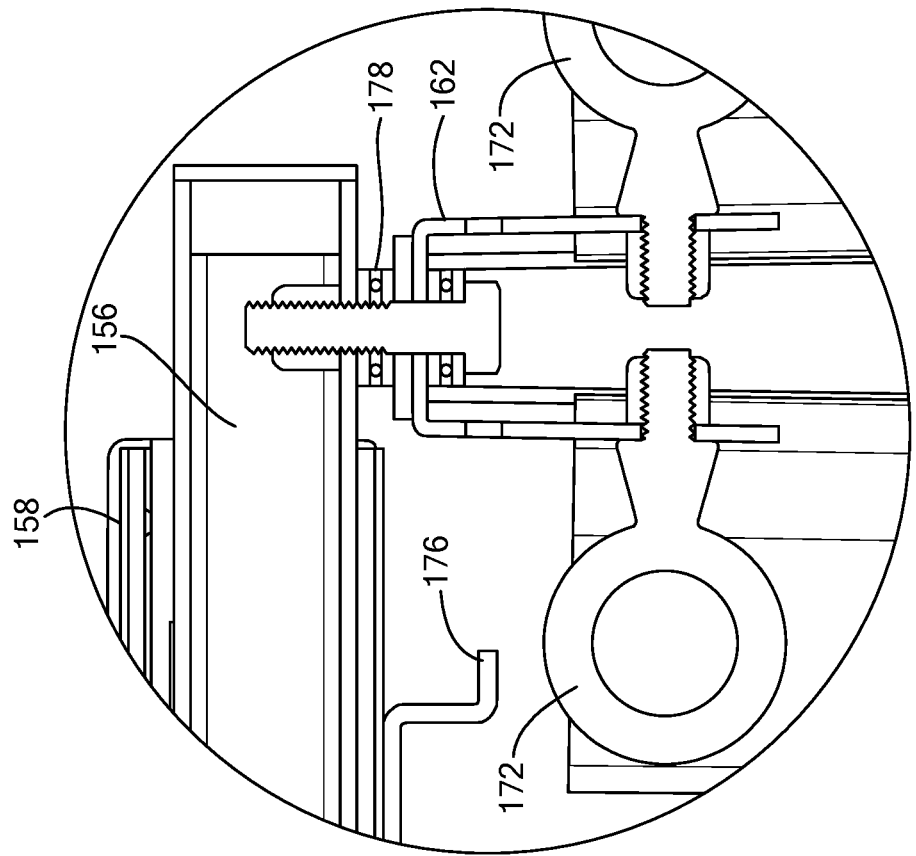
FIG. 12A is a partial side view of the telescoping arm and hanger arm.

The hanger arm 162 can include a handle 172 on each side for grasping by a farmer to extend and retract the telescoping arm. When the telescoping arm has been extended, the hanger arm can be rotated so that the plant panels on both sides can be accessed. Each hanger arm can include a locking slot 174 on each central front tab to mate with a locking tab 176 on the arm housing when the telescoping arm is retracted, to secure the plant panel in its grow position. See FIGS. 12A, 12B. The telescoping arm can also be motorized in addition to or alternatively to manual operation to extend and retract the arm.

Each hanger arm 162 is rotatably mounted to the end of an associated telescoping slide 156 with a rotary or swivel joint 178 centrally located along the hanger arm. (See FIG. 12A.) The rotary joint allows each hanger arm to be independently rotated in a horizontal plane such that the orientation of the plant walls can be reversed. Thus, plants facing outwardly can be rotated to face inwardly, and plants facing inwardly can be rotated to face outwardly. In this manner, all of the plants can be readily accessed by a farmer desiring to remove one of the plant panels to check on the plants therein or to harvest the plants from a plant panel. The rotary joint can be motorized, or can be operated by hand, or both. In one embodiment, a swivel joint includes a bolt and a pair of thrust bearings on either side of the top plate.

Figure 13A:
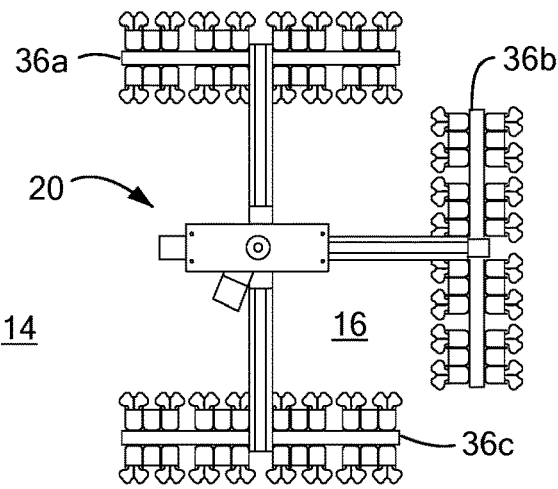
FIGS. 13A-13F are schematic illustrations of a sequence illustration rotation of a plant wall.
Figure 13B:
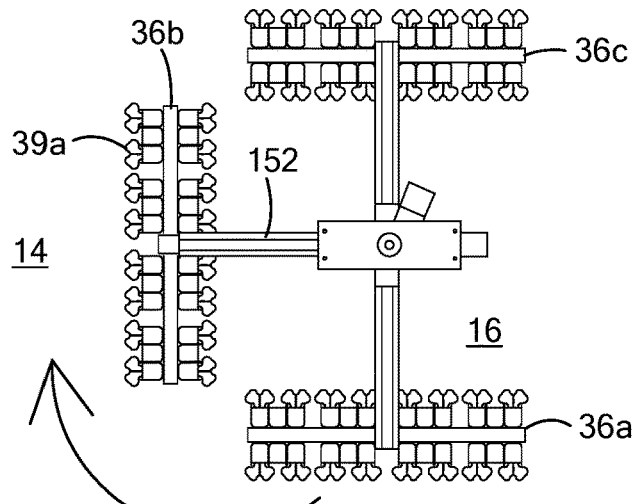
Figure 13C:
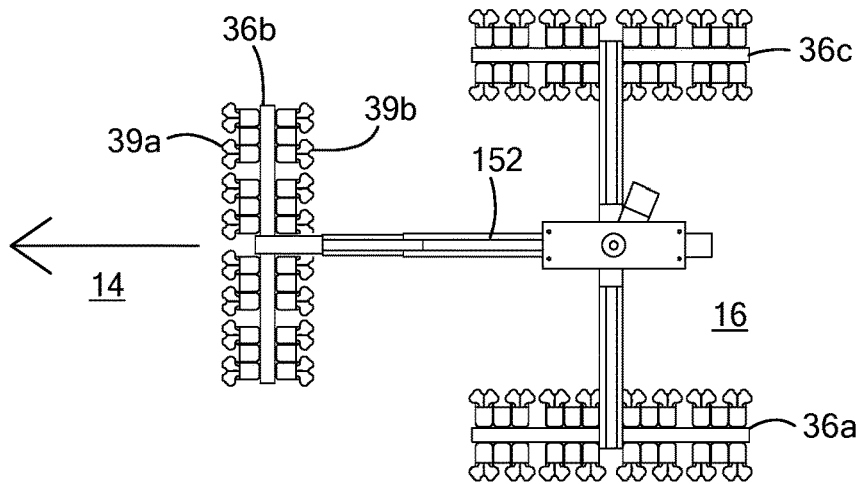
Figure 13D:
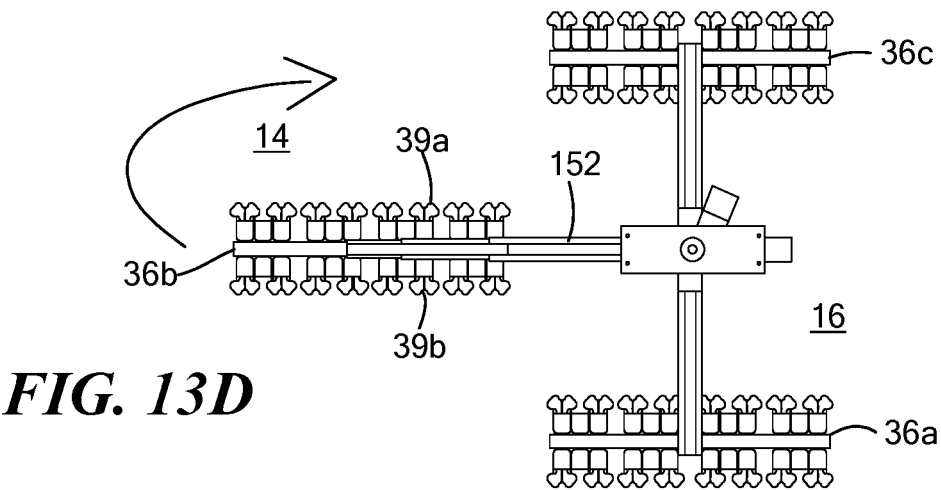
Figure 13E:
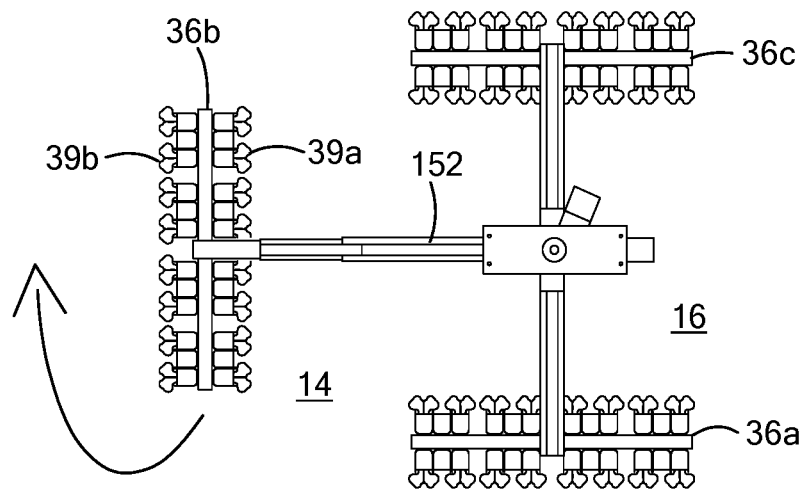
Figure 13F:
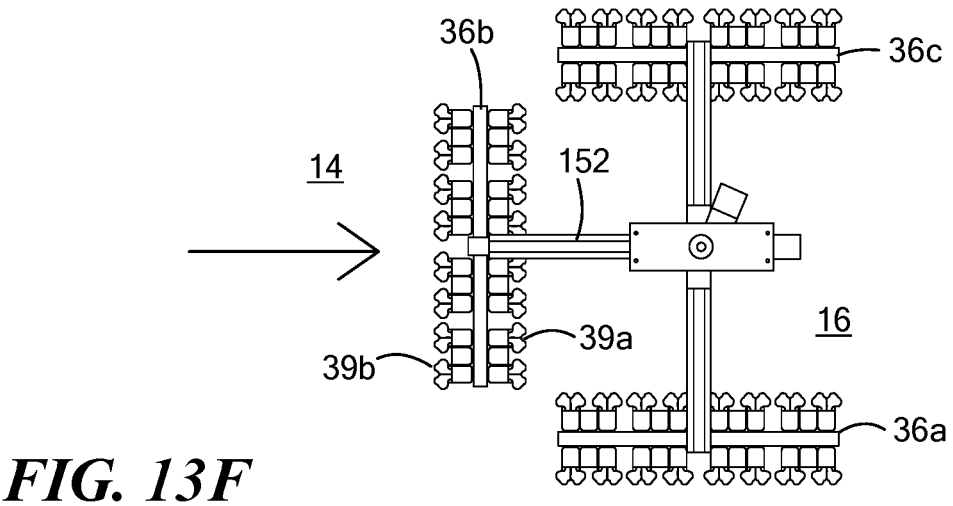
Figure 14:
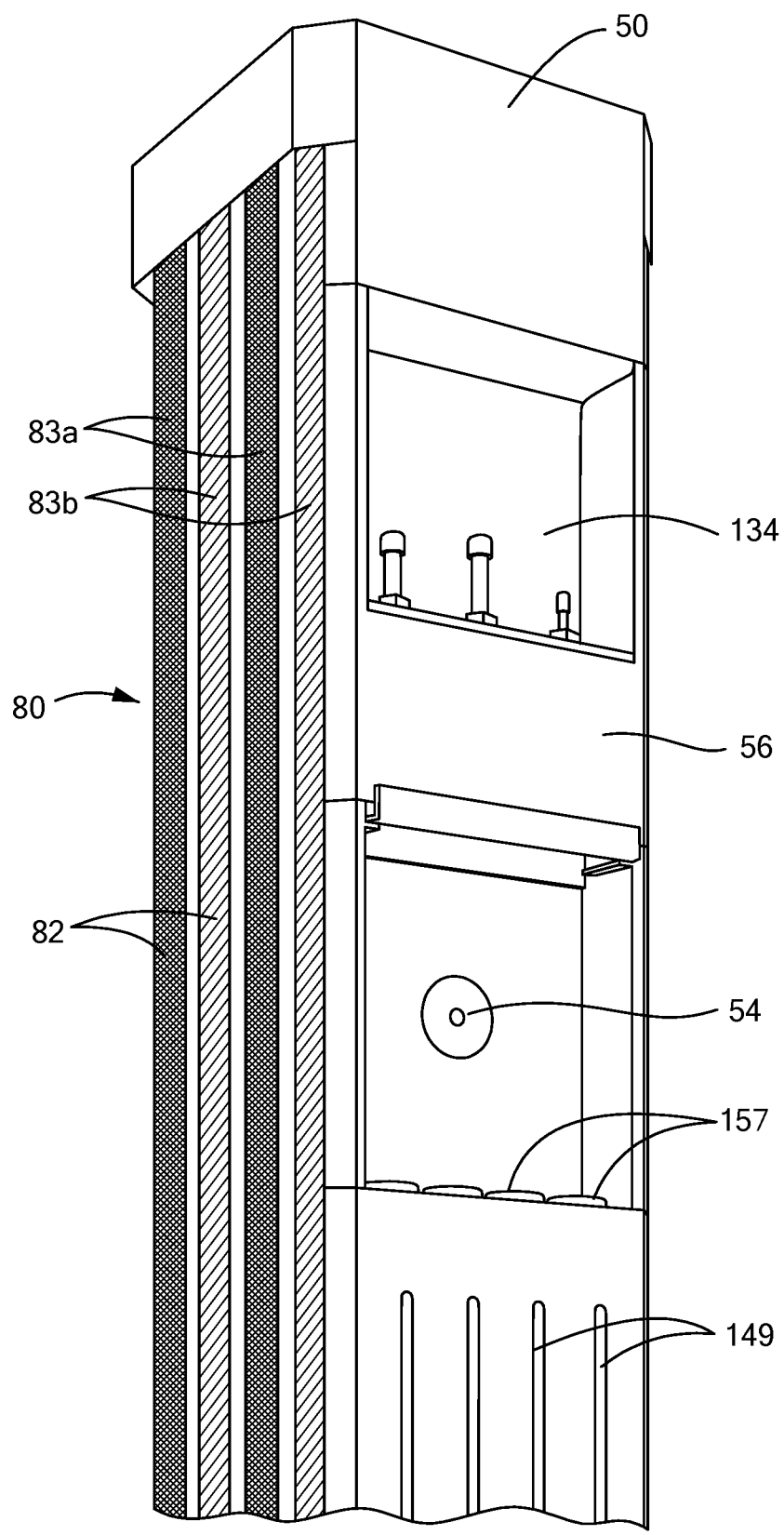
FIG. 14 is a partial isometric view of an embodiment of a central column of the modular farm.
Figure 15:
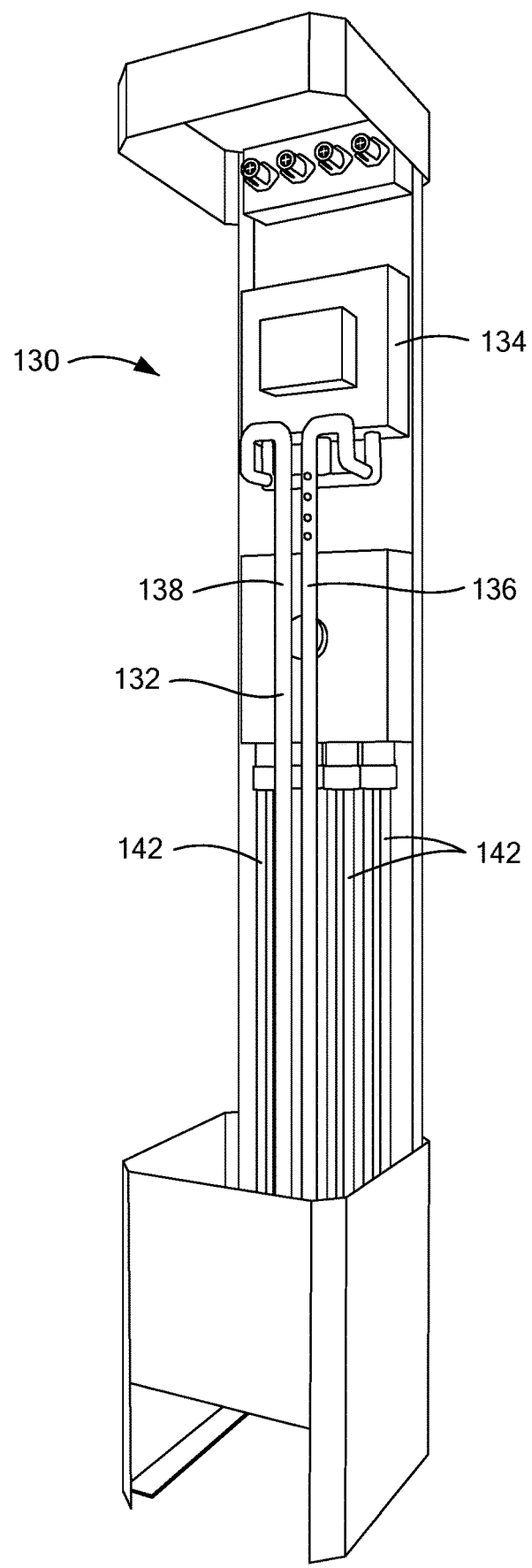
FIG. 15 is a partial isometric view of an interior of the central column of FIG. 14.
Figure 16:
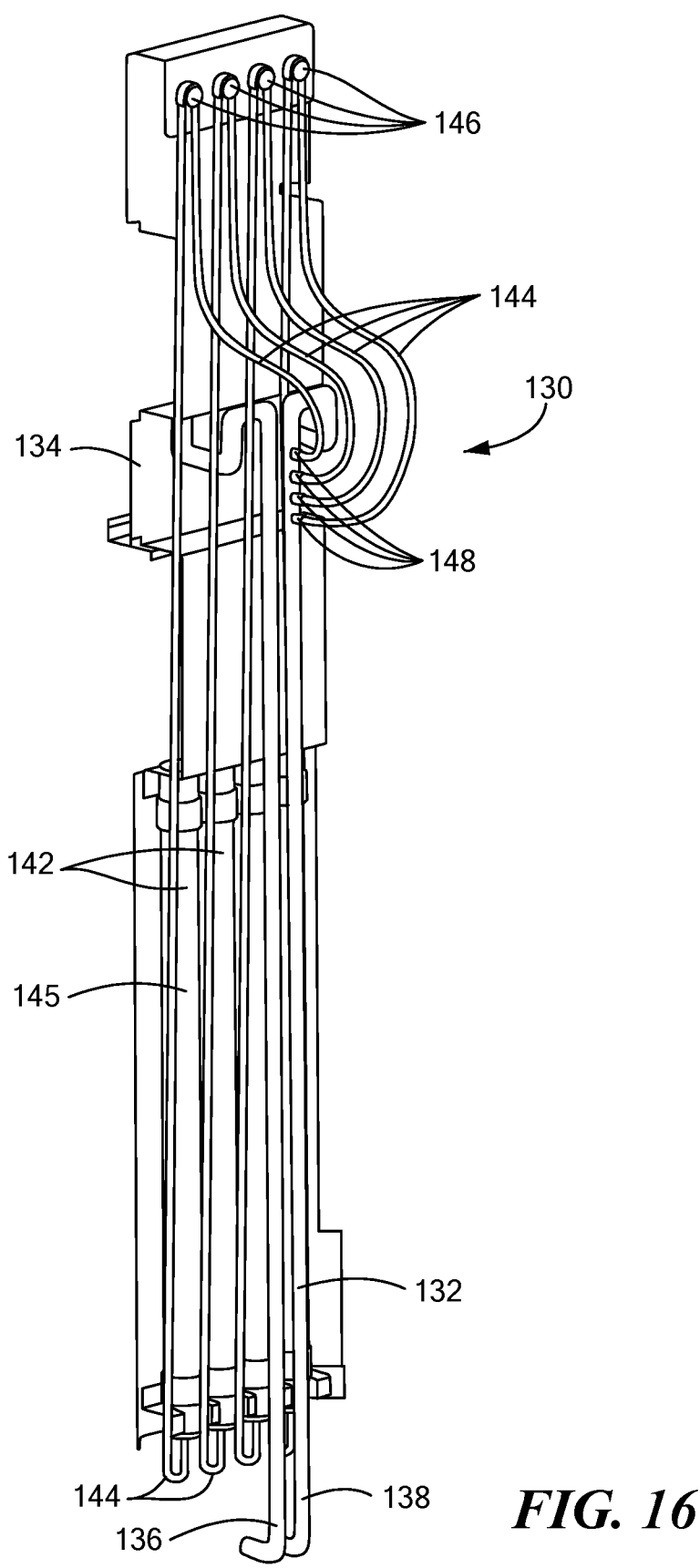
FIG. 16 is a further partial isometric view of the interior of the central column of FIG. 14.
Figure 17:
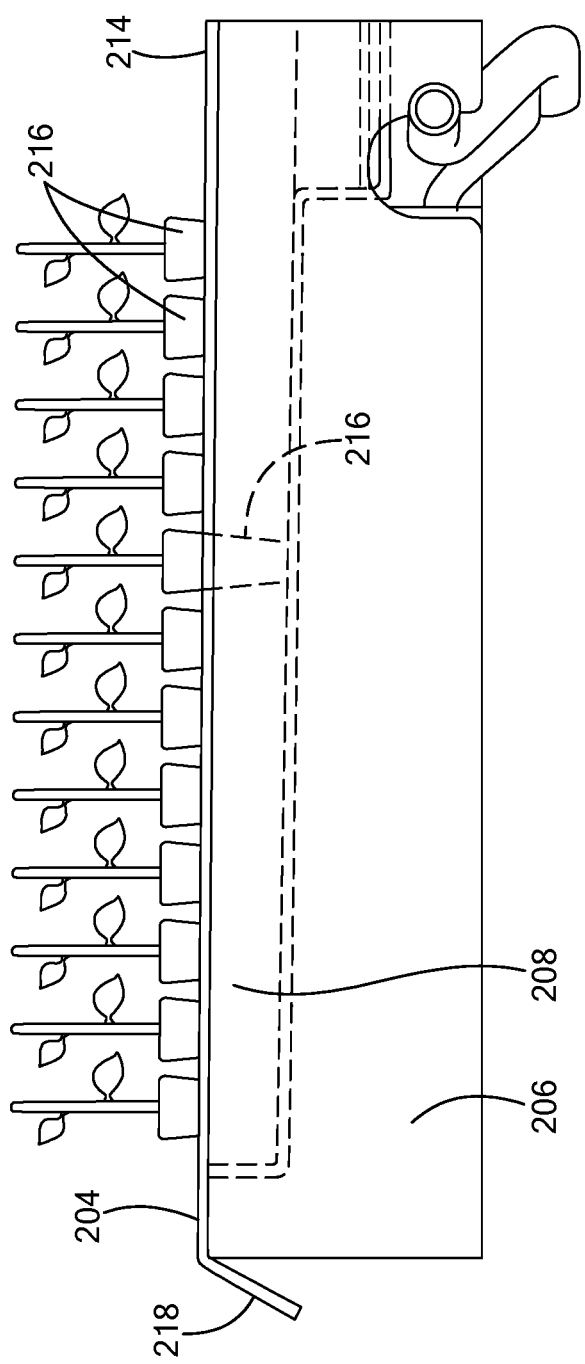
FIG. 17 is a side view of an embodiment of a water trough in a seedling station.
Figure 18:
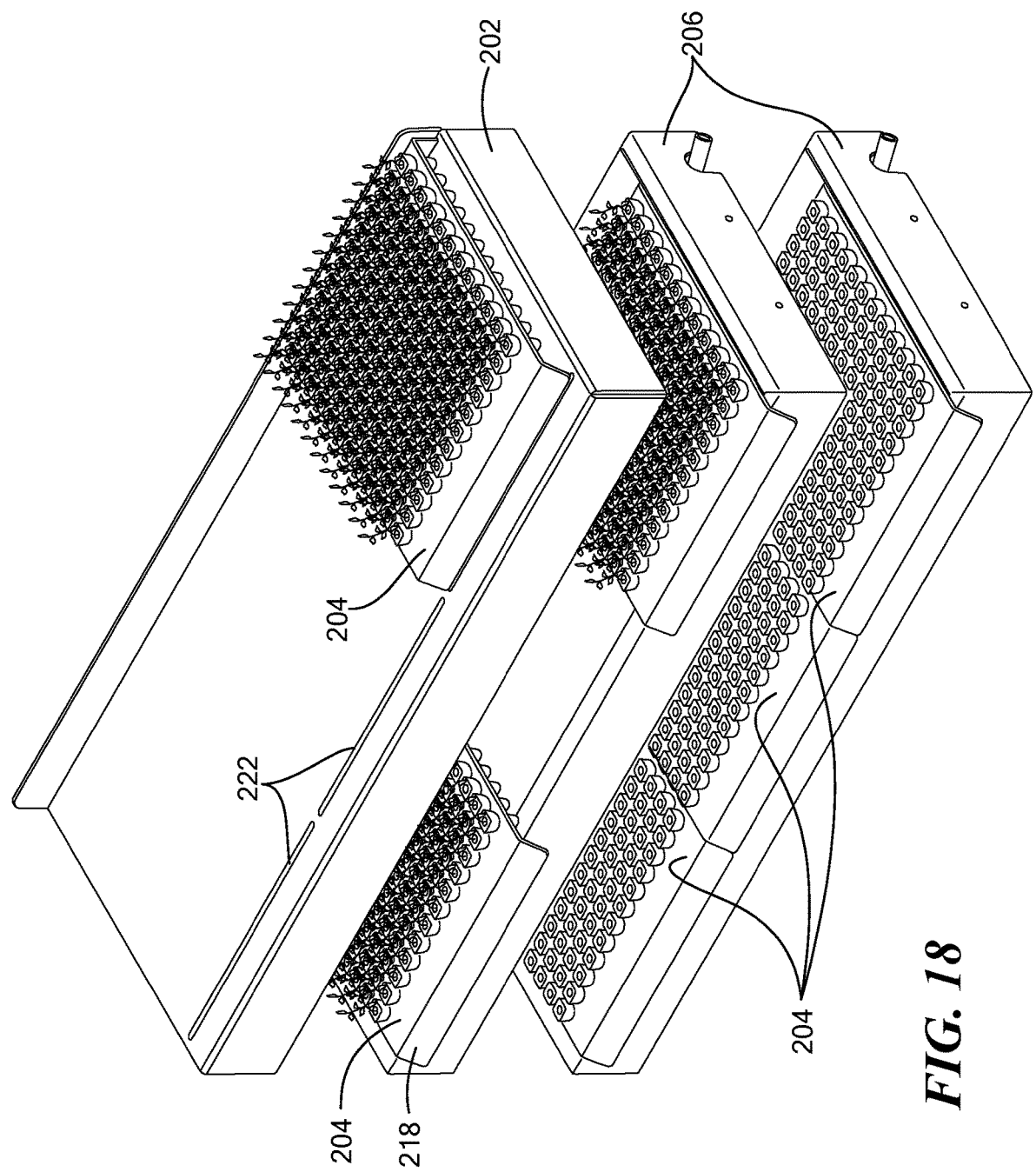
FIG. 18 is an isometric view of an embodiment of a seedling station.

FIGS. 13A-13F illustrate a sequence of steps for accessing plant panels. FIG. 13A shows the carousel system 20 in a home position in which no plant walls 36a, 36b, 36c face the work zone. In FIG. 13B, the central hub has been rotated 180° so that a first side 39a of a plant wall 36b is accessible from the work zone. In FIG. 13C, the telescoping arm 152 has been extended toward the work zone 14. In FIG. 13D, the hanger arm has been rotated 90°, and in FIG. 13E, the hanger arm panel has been rotated another 90°, for a total rotation of 180°, so that a second side 39b of the plant wall 36b faces the work zone. In FIG. 13F, the telescoping arm 152 has been pushed back toward the central column and secured in place. From this position, plant panels on the second side 39b of the plant wall 36b can be readily accessed.

In one embodiment, each hanger arm can hold four plant panels on each side. The entire carousel system can hold 24 plant panels. For a crop such as miniature head lettuce, the plant panels can provide 1054 plant sites. 150 miniature head lettuce can be harvested per week.

It will be appreciated that the grow towers can have other configurations. For example, in some further embodiments, a plurality of individual channel-shaped towers can be provided. Each tower can be individually suspended vertically from the carousel grow structure in the container. Each tower can include a hole or holes near the top for hanging on a hook or tab from the carousel grow structure or can be suspended from a rotary or swivel joint.

Figures 19, 20:
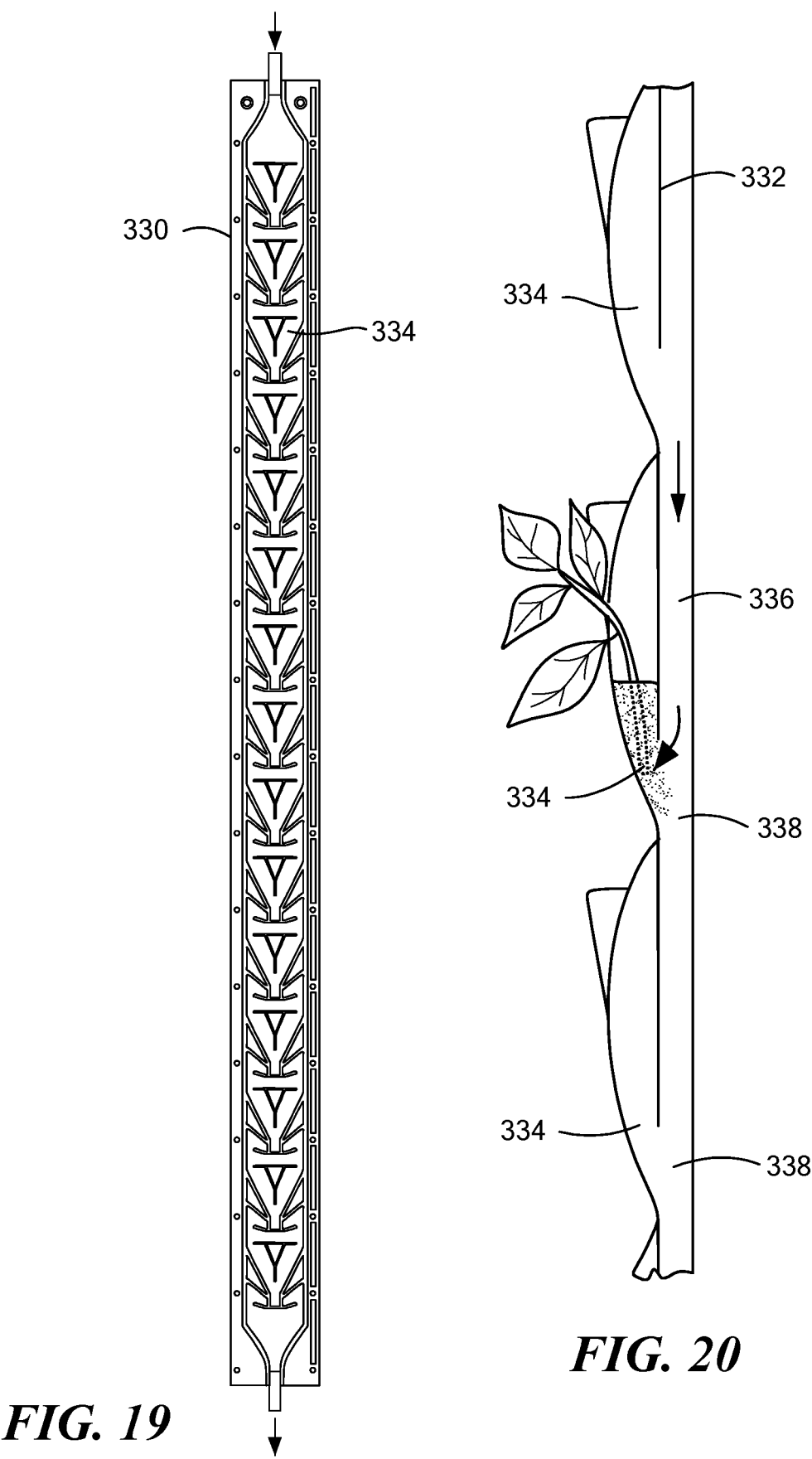
FIG. 19 is a front view of a further embodiment of a grow tower.
FIG. 20 is a side view of the plant grow tower of FIG. 19.

Referring to FIGS. 19-20, in some embodiments, a grow tower 330 can be a plant panel assembly having support panel 332, a grow pocket 334 on one face of the support panel, a nutrient flow channel 336 on an opposite face of the support panel, and a fluid aperture 338 in the support panel for fluid communication between the grow pock and the nutrient flow channel. One or more openings for a hook can be provided at the top of the support panel for suspension from the carousel assembly. In some embodiments, a rotary or swivel joint can be provided for suspension from the carousel assembly.

Figure 21:
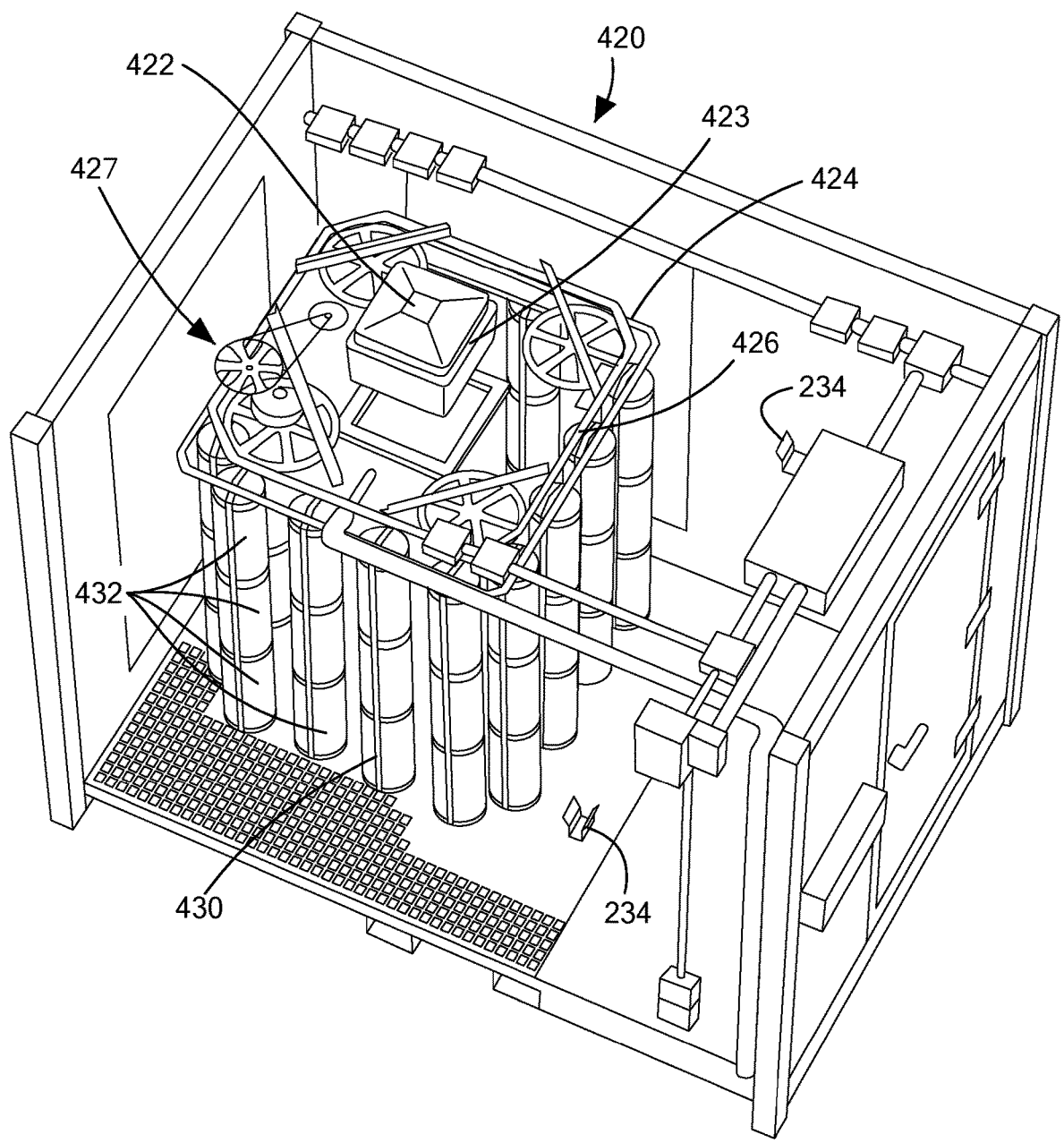
FIG. 21 is an isometric view of a modular farm with a further embodiment of a carousel system and a grow tower.
Figure 22:
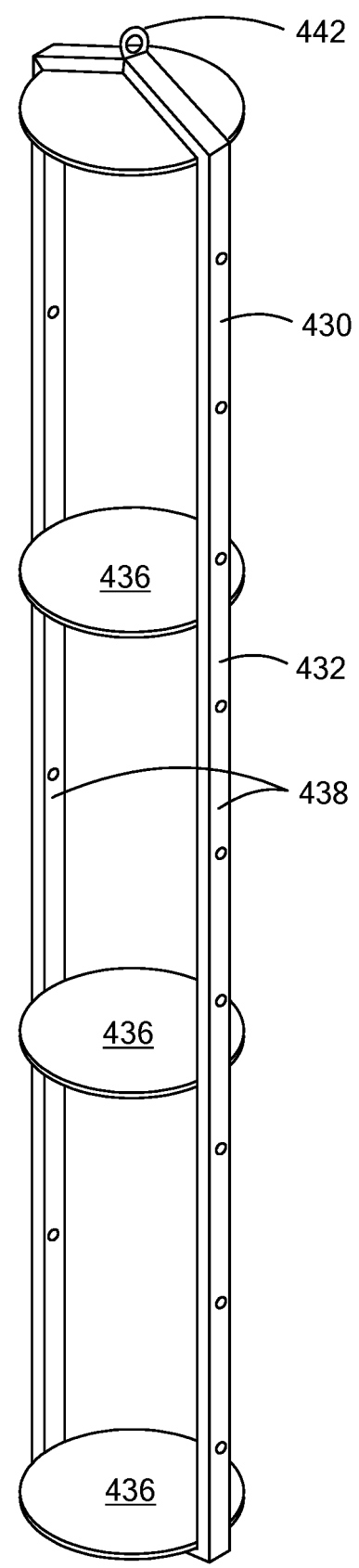
FIG. 22 is an isometric view of the embodiment of the grow tower in FIG. 21.

Referring to FIGS. 21-22, in some embodiments, a grow tower 430 can be formed as a rack 432 to support one or more receptacles 434. In some embodiments, the rack 432 can include one or more shelves 436 on which a receptacle can be placed. The shelves can be attached via one or more vertical rods 438 to a hanging fixture 442. In some embodiments, the receptacle can be a bag or closed receptacle that can contain an inoculated substrate suitable for growing fungi including mushrooms. In some embodiments, the receptacle can be a pot configured for a desired plant.

In some embodiments, a carousel system 420 can include a hub 422 comprising a stationary base 423, which can be mounted to a ceiling or roof structure. A rotation mechanism 424 mounted to the stationary base can provide rotation about a vertical axis with respect to the stationary base. In some embodiments, the rotation mechanism can be configured to drive a belt 426 along a horizontal track surrounding the central vertical axis. The belt can be driven in any suitable manner, such as by gearing 427 arranged to surround the hub, driven by a motor. Grow towers, such as the racks 430, can be suspended from the belt for travel therewith. In some embodiments, the racks can be suspended with a hook and eye fixture; in some embodiments, the racks can be suspended with a rotary or swivel joint to provide for rotation about a further vertical axis spaced from the vertical axis of the stationary base.

The carousel system can also have other configurations. For example, in the embodiment illustrated, the carousel system is arranged to suspend the grow towers in a generally square configuration in plan view, although other configurations can be provided. Also, three plant walls are illustrated; however, two plant walls or four or more plant walls can be provided. In other embodiments, the carousel system can be configured to suspend the grow towers to move in different configurations or patterns. For example, in a larger container, grow towers can be moved in an oval configuration or in a serpentine configuration. The carousel system can be configured as needed to fit within any particular container size and shape. In some embodiments, more than one carousel system can be provided within a container.

The central column 50 can be provided within the container 10 for supporting various systems, such as a portion of the lighting system 80, described further below, and the nutrient dosing system 130. A front panel 256 or portions of the front panel the central column facing the work zone can be removable for accessing components therein for repair or replacement. In some embodiments, a camera 54 can be mounted on the central column for photographing plants growing on grow towers facing the camera.

The modular farm can include the lighting system 80 to provide lighting for the growing plants. In some embodiments, lights 84 are provided on three interior walls of the container—two side walls and an end wall—to form a portion of a perimeter of the grow zone in which the carousel system 20 is mounted for suspending the plants. In some embodiments, recesses can be formed in the opposed side walls and in the end wall for mounting the lights. In some embodiments, lights 82 can be mounted on three sides of the central column 50 located below the hub of the carousel system. The carousel system can suspend the grow towers with plants facing both outwardly, toward the lights 84 provided on the side and end walls, and inwardly, toward the lights 82 in the central column. In this manner, the lights can be placed sufficiently close to the growing plants.

In some embodiments, the lights can be provided as a number of LED light strips arranged vertically on the side and end walls and on the central column. In some embodiments, the lights can be provided as light curtains. The lights can be selected for appropriate frequencies. The lights can be selected for a particular crop. In some embodiments, a mixture of frequencies, such as of blue lights 83a and red lights 83b, can be provided. In some embodiments, blue lights can be provided, for example, for mushrooms.

White work lights can be provided for when a farmer is working inside the container. In one embodiment, the white lights can be provided as horizontal LED light strips 86 near the ceiling. The white lights can be operated by a switch located in the work zone, so that a farmer can turn them on and off as needed. The white lights can be operated on a timer, so that they will turn off automatically after a period of time.

In some embodiments, lights can be provided on three sides, and the fourth side of the grow zone is left free of lights. The carousel system 20 can be rotatable, as described herein, so that the plants can spend some time away from the lights in a resting side. In some embodiments, the resting side can face the work zone 14 so that the plant panels on the resting side are more accessible to the farmer than are plant panels on any of the other three sides.

Figure 23:
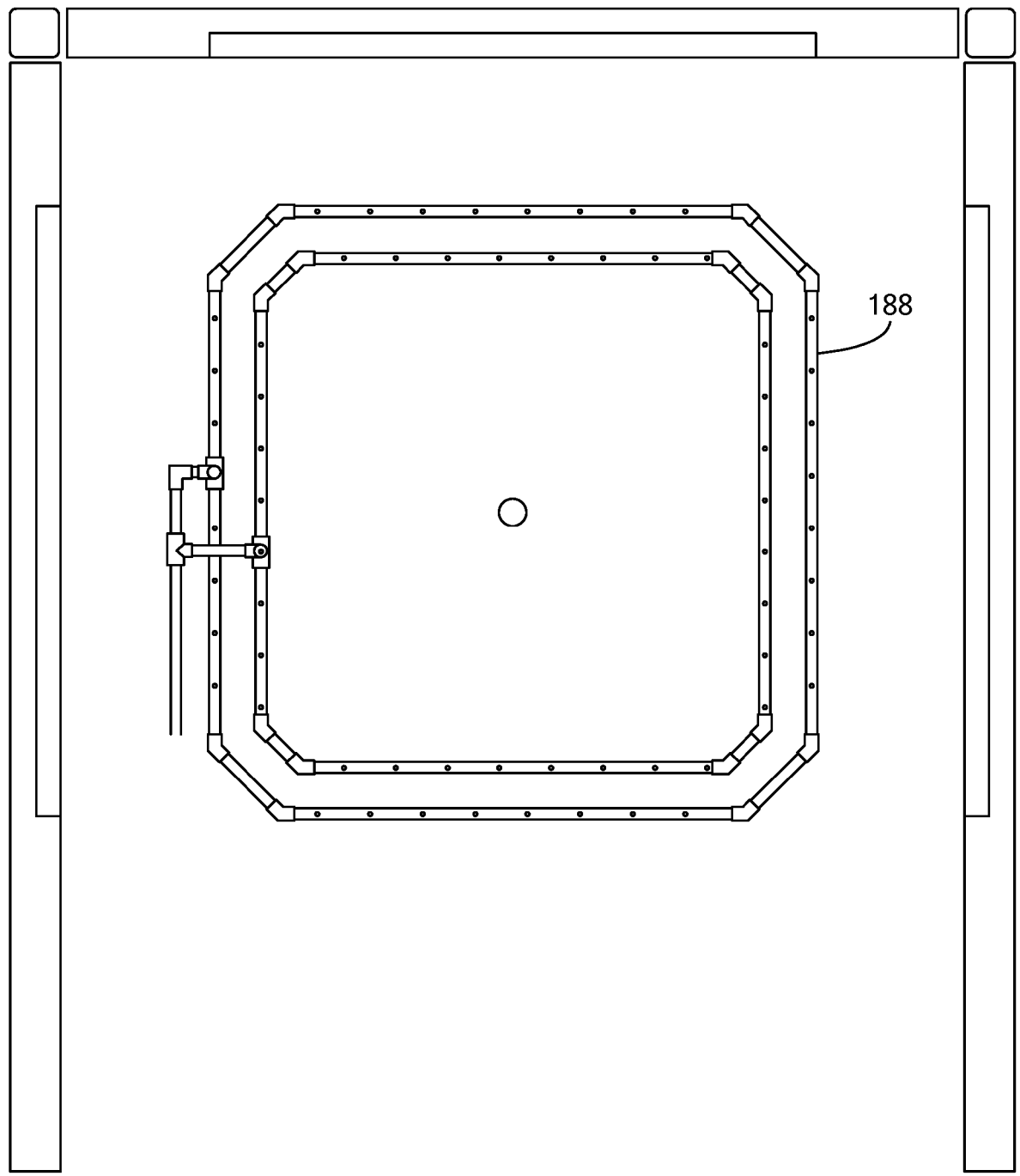
FIG. 23 is a top plan view of an embodiment of piping assembly of an irrigation system.

The irrigation system 60 is provided to supply a liquid nutrient solution to the growing plants in the plant panels. In some embodiments, the irrigation system can include a reservoir 62, which can be located below the floor 182 of the container, for example, below the work zone 14, and can include an irrigation line 184 extending from a pump 186 in the reservoir 62 upward to a location about the top ends of the grow towers. The irrigation line can feed into a piping assembly 188 supported above the grow towers 30. See FIGS. 2 and 23. The piping assembly can include a length of pipe for alignment with each row of grow towers. In one embodiment, the piping assembly is arranged in two generally square configurations arranged to align with the generally square configurations of the plant panels suspended from the carousel system. Each length of pipe includes a number of downwardly opening emitters 192 or nozzles. Each emitter aligns with a channel 32 in a grow tower 30, such that a nutrient solution can be discharged from the emitter into the open top of the channel. The nutrient solution flows downwardly along the length of the channel to nourish the plants growing therein. Excess nutrient solution is discharged from the open end at the bottom of each channel. See FIG. 2. In some embodiments, the emitters can emit a spray, for example, to mist the air around the crop. For example, misting the air around a crop of mushrooms can be useful.

The excess nutrient discharged from the towers is collected in a catchment 194 below the grow zone 16. A grate 196 can cover the catchment to allow the solution to pass into the catchment. The grate can also provide a floor surface in the grow zone. A farmer can step on the grate if necessary. The grate can be removable. The catchment can be sloped to allow the nutrient solution to drain back to the reservoir, illustrated by arrow 195 in FIG. 2.

The reservoir 62 can be located beneath a further section of the floor 182, for example, beneath the work zone 14, which can be covered with a solid floor surface. An access opening for the reservoir can be formed in the solid floor surface. An incoming water line 192 and drain line can be provided, for example, along the lower edge of the container. Appropriate plumbing fittings 191 for water piping or hosing can be provided on the exterior of the container. In this manner, water can be introduced into and removed from the reservoir in the container.

The modular farm can include the nutrient dosing system 130, in which appropriate amounts of nutrients can be added to water in the reservoir 62 to form the liquid nutrient solution that is fed to the growing plants. In some embodiments, the nutrient dosing system includes a recirculation line 132 that cycles a liquid nutrient solution from the reservoir through the dosing system and returns it to the reservoir. A sensor assembly 134 in the recirculation line includes sensors to sense various parameters, such as pH, electrical conductivity, and temperature. If any adjustments are needed, the needed additives can be added to the recirculation line, based on the output of the sensor assembly.

In some embodiments, the nutrient dosing system 130 can be housed within the central column 50. See FIG. 3. The recirculation line can include an input line 136 that leads upwardly within the column and can be routed, for example, with suitable elbow fixtures, past the sensor assembly 134 and to a discharge line 138 extending downwardly to the reservoir. A plurality of nutrient sources 142 can be housed within the column, such as in canisters 145. A dosing tube 144 can lead from a bottom of each canister, through a metering device, such as a peristaltic pump 146, to an inlet in the discharge line, for example, via delivery barbs. When the sensor assembly determines that a particular nutrient or additive is needed, the associated metering device is actuated to add an appropriate amount. In some embodiments, the sensor assembly can include a controller that actuates the metering devices to introduce an appropriate amount of the additive based on the sensed data.

In some embodiments, one canister can include a mixture of minerals suitable for growing crops, such as phosphorus, potassium, nitrogen, calcium, and nitrates. A second canister can include an additive to adjust the pH. A third canister can include mycorrhizae, which can be helpful for root growth. A fourth canister can include a cleaning solution, which can periodically be circulated through the lines. Any number of canisters and desired nutrients can be provided. In some embodiments, a viewing slot 149 can be provided in the central column for checking on the level of nutrient in each canister. A delivery port 151 can be provided at the top of each canister for adding more nutrient when needed or replacing an empty canister with a full one. The deliver ports can be accessible via a recess in the central column.

In some embodiments, the liquid nutrient solution 130 can be continuously or periodically recirculated through the nutrient dosing system, so that the amount of nutrients can be monitored continuously or periodically. In this manner, the nutrient solution in the reservoir can be maintained with appropriate nutrient levels.

In some embodiments, the nutrient dosing system can be mounted on an interior wall of the container, such as below or adjacent to the seedling station. See FIG. 1.

Referring to FIGS. 2-3 and 17-18, the seedling station 40 can be mounted on an interior wall of the container adjacent the work zone 14. In some embodiments, the seedling station can include a top work shelf 202 on which a seedling tray 204 can be placed while a farmer works on it to plant seed or move seedlings to a grow tower. One or more lower shelves 206 contain water troughs 208 for supplying water to seedling plugs placed in a seedling tray in which seedlings grow. Each trough shelf can include tubing 212 for filling and draining the trough with the nutrient solution from the reservoir 62. A bottom floor of the trough is sloped so that water is directed across the surface from a high end to a low end. See FIG. 2. In the embodiment shown, nutrient solution can enter from the fill tubing at the high end at the front and left side and flow along the slope to the low end at the rear and right side, where drain tubing is located. A seedling tray 204 can include a top wall 214 having a plurality of openings therein in which seedling plugs 216 sit so that the bottom of each plug reaches the trough floor to access the nutrient solution when placed on the water trough shelf. The seedling tray can also include a handle 218 along a front edge that fits within a supporting groove 222 on the top work shelf 202 to prevent the tray from moving about when a farmer is working on it. When the seedling tray is placed on the trough shelf 206, the handle overhangs the edge of the trough.

A seedling pump 224 can be provided for each water trough shelf 206 to provide the nutrient solution to the seedlings. The seedling pumps can be located in the reservoir 62 beneath the floor of the work zone. The fill and drain tubing to and from the seedling pumps extends within a wall portion of one of the container walls. Lights 228 can be mounted beneath the work shelf 202 and the upper trough shelf 206 to provide light for seedlings on the trough shelves.

The work zone can include a fixture for supporting a grow tower that has been removed from the carousel system. The grow tower can be supported in a horizontal orientation at a suitable height for a farmer to work on the plants in the grow tower. In one embodiment, a bracket 234 is provided on one wall for supporting one end of the grow tower. The other end of the grow tower can be supported on the work shelf 202 of the seedling station. In another embodiment, the other end of the grow tower panel can be supported by a second bracket on the opposite wall. See FIG. 22.

In some embodiments, various parameters of the container and the environment therein can be controlled to be optimized for a particular crop that is desired to be grown in the container. The systems can be automated and can be controlled by a suitable control system. In some embodiments, a control system can be provided to schedule movement of the carousel grow structure and operation of the lights. Sensor readings can be transmitted to the control system, which can determine whether adjustments are needed. The control system can be located within the container or remotely or both. For example, in some embodiments, an app that can run on a device such as a smart phone can be used to alert a farmer to various parameters, to send photographs, and to allow the farmer to control the systems to adjust and optimize the growing conditions.

The climate control system 110 can include an HVAC system for the container. In some embodiments, an air conditioning unit 252 can be located on the roof of the container. A number of air registers can be located in the ceiling panel. An exhaust cowl can be located in the roof of the container. Climate sensors 256 can be located within the container to sense parameters such as air temperature, humidity level, $CO_2$ level and air flow. In some embodiments, the climate sensors can be located on the central column or the stationary base of the hub of the carousel system. The climate control system can be operative to maintain the climate within a selected range of parameters, which can vary depending on the particular crop being grown in the container. In some embodiments, an intake air housing and supply fan can be located in the container. The fan can be oriented to blow air upwardly past the plants.

The container can have any configuration and can be formed in any suitable manner. In some embodiments, the container is formed with four wall panel assemblies, a roof panel assembly, and a floor panel assembly supported by suitable framing. The panel assemblies can be made from any suitable material(s). In one embodiment, the panels can be thermally insulated with, for example, a fiberglass or other insulating material between inner and outer panels. The inner and outer panels can be formed of a fiberglass material. A door for user access is located in one end wall panel. The inner and outer panels of each panel assembly can be shaped or configured as desired. For example, side and back wall inner panels can be formed with a recess to hold lights.

The container can be framed in any suitable manner. In one embodiment, the framing can include columns at each corner and beams connecting the columns at their upper and lower ends. Floor and ceiling frame elements can be spaced to allow for placement of various pieces of equipment. Framing and other structural members can be made of any suitable material, such as a metal, for example, steel. The panels can be fastened to the framing elements in any suitable manner. The container can include fork lift pockets underneath, so that it can be transported by a fork lift.

Service lines for irrigation and electrical power can be provided in void spaces, for example, in the ceiling and walls. Controls, such as switches and the like, for operating the various systems, such as the lighting system, the carousel system, and the irrigation system, can be included within the work zone for operation by the farmer. For example, the farmer can control a motor of the carousel system to bring a desired plant wall to a location for access from the work zone.

The modular farm described herein can be used to grow a large variety of crops, particularly green, leafy plants. For example, the device can be used to grow leafy greens, such as lettuce, spinach, chard; brassicas, such as broccoli, cabbage, cauliflower, Brussels sprouts, kohlrabi, mustard, kale, arugula; and herbs such as basil, oregano, parsley, and mint. Other crops can include tomatoes, flowers, root vegetables, or mushrooms. The modular farm can be used for seed germination, post germination plant growth, or post seedling plant growth. Any suitable growing medium or plant support medium can be used, depending on the particular crop. As used herein, the terms "plant" or "plants" can include fungi, including mushrooms.

As used herein, "consisting essentially of" allows the inclusion of materials or steps that do not materially affect the basic and novel characteristics of the claim. Any recitation herein of the term "comprising," particularly in a description of components of a composition or in a description of elements of a device, can be exchanged with "consisting essentially of" or "consisting of."

It will be appreciated that the various features of the embodiments described herein can be combined in a variety of ways. For example, a feature described in conjunction with one embodiment may be included in another embodiment even if not explicitly described in conjunction with that embodiment.

The present invention has been described in conjunction with certain preferred embodiments. It is to be understood that the invention is not limited to the exact details of construction, operation, exact materials or embodiments shown and described, and that various modifications, substitutions of equivalents, alterations to the compositions, and other changes to the embodiments disclosed herein will be apparent to one of skill in the art.

What is claimed is:

1. A modular farm for plant production, comprising:
 a container;
 a carousel system mounted for rotation about a central vertical axis within the container; and a plurality of grow towers mountable to the carousel system for rotation therewith about the central vertical axis, each grow tower comprising an elongated column for growing plants, wherein one or more of the grow towers comprises a plant panel comprising a plurality of adjacent, integrally formed elongated channels, and a mounting fixture disposed on a back wall of the plant panel configured to removably suspend the plant panel from the carousel grow structure.

2. The modular farm of claim 1, wherein each grow tower is further mountable to the carousel system for rotation about a further vertical axis spaced from the central vertical axis.

3. The modular farm of claim 1, further comprising an enclosed space within the container comprising a grow zone and a work zone, and wherein the carousel system is operable to rotate the grow towers about the vertical axis to move a portion of the grow towers into a location accessible from the work zone.

4. The modular farm of claim 1, further comprising an irrigation system comprising:
a nutrient solution reservoir disposed in a region below a floor of the container;
an irrigation line disposed to deliver a liquid nutrient solution from the nutrient solution reservoir to an upper end of each grow tower; and
a pump in the nutrient solution reservoir connected to the irrigation line.

5. The modular farm of claim 1, further comprising a nutrient dosing system comprising:
a recirculation line disposed to recirculate a liquid nutrient solution from a nutrient solution reservoir,
a plurality of nutrient sources, and
a line from each nutrient source to the recirculation line to introduce a nutrient into the recirculation line.

6. The modular farm of claim 1, further comprising:
a central column aligned with the central vertical axis; and
a lighting system comprising lights disposed on sides of the central column to provide light to plants in each grow tower facing the central column.

7. The modular farm of claim 1, further comprising a lighting system in the grow zone comprising:
a first set of lights disposed inwardly of and facing outwardly toward the grow towers; and
a second set of lights disposed outwardly of and facing inwardly toward the grow towers.

8. The modular farm of claim 1, further comprising a seedling station disposed within the container, the seedling station comprising a seedling trough disposed to support one or more seedling trays supporting seedling plugs in contact with a liquid nutrient solution in the trough.

9. The modular farm of claim 1, further comprising support surfaces disposed on opposite interior walls of the container in a work zone to support a grow tower in a horizontal orientation for access by a user.

10. The modular farm of claim 1, further comprising:
a central column aligned with the central vertical axis; and
a camera mounted to the central column and disposed to photograph plants growing in the plant grow towers.

11. The modular farm of claim 1, further comprising:
a central column aligned with the central vertical axis; and
a climate sensor mounted to the central column to sense one or more of air temperature, humidity, and a $CO_2$ level within the container.

12. The modular farm of claim 1, further comprising a climate control system comprising a heating, ventilating, and air conditioning system.

13. A carousel system for growing plants comprising:
a hub comprising a stationary base including a mounting fixture to attach to a ceiling or roof structure, and a rotation mechanism attached to the stationary base for rotation about a vertical axis with respect to the stationary base;
a plant tower support assembly attached to the rotation mechanism for rotation therewith;
a plurality of grow towers suspendable from the plant tower support assembly for rotation therewith about the central vertical axis, each grow tower including an elongated column for growing plants,
wherein each grow tower comprises a plant panel comprising a plurality of adjacent, integrally formed elongated channels, and a mounting fixture disposed on a back wall of the plant panel configured to removably suspend the plant panel from the grow tower support assembly.

14. The carousel system of claim 13, wherein the grow tower support assembly comprises an arm assembly attached to the rotation mechanism, and each grow tower is mounted to the arm assembly for rotation about a further vertical axis spaced from the vertical axis.

15. The carousel system of claim 14, wherein the arm assembly comprises a plurality of telescoping arms extending from the rotator, each of the plurality of grow towers mounted to a distal end of an associated one of the telescoping arms.

16. The carousel system of claim 13, wherein the plurality of grow towers are arranged to form plant walls with the elongated channels of the grow towers disposed to face outwardly to form opposite sides of each plant wall.

17. The carousel system of claim 13, wherein each grow tower is suspended from the grow tower support assembly for rotation about a further vertical axis spaced from the vertical axis.

18. The carousel system of claim 13, wherein the grow tower support assembly comprises a belt disposed to travel along a track surrounding the central vertical axis, and each grow tower is suspended from the belt for travel therewith.

\* \* \* \* \*